(12) United States Patent
Abrams

(10) Patent No.: US 7,393,576 B2
(45) Date of Patent: Jul. 1, 2008

(54) PROCESS FOR PRINTING AND MOLDING A FLOCKED ARTICLE

(75) Inventor: Louis Brown Abrams, Fort Collins, CO (US)

(73) Assignee: High Voltage Graphics, Inc., Fort Collins, CO (US)

(*) Notice: Subject to any disclaimer, the term of this patent is extended or adjusted under 35 U.S.C. 154(b) by 96 days.

(21) Appl. No.: 11/036,887

(22) Filed: Jan. 14, 2005

(65) Prior Publication Data

US 2005/0266204 A1 Dec. 1, 2005

Related U.S. Application Data

(60) Provisional application No. 60/537,110, filed on Jan. 16, 2004.

(51) Int. Cl.
B32B 33/00 (2006.01)
B05D 1/14 (2006.01)
B05D 1/16 (2006.01)

(52) U.S. Cl. .............. 428/90; 428/86; 428/96; 428/97; 428/375; 428/378

(58) Field of Classification Search ........... 428/90, 428/96, 97, 86, 375, 378
See application file for complete search history.

(56) References Cited

U.S. PATENT DOCUMENTS

| | | | |
|---|---|---|---|
| 1,905,989 A | 4/1933 | Safir et al. | |
| 1,905,999 A | 4/1933 | Ellis | |
| 2,592,602 A | 4/1952 | Saks | |
| 2,636,837 A | 4/1953 | Summers | |
| 2,999,763 A | 9/1961 | Sommer | |
| 3,215,584 A | 11/1965 | McConnell et al. | |
| 3,271,370 A | 9/1966 | Akin et al. | |
| 3,314,845 A * | 4/1967 | Perri | 428/90 |
| 3,331,889 A | 7/1967 | Caldwell et al. | |
| 3,331,890 A | 7/1967 | Caldwell et al. | |
| 3,377,232 A * | 4/1968 | Meacock et al. | 428/90 |
| 3,381,058 A | 4/1968 | Caldwell et al. | |
| 3,459,579 A | 8/1969 | Newman | |
| 3,496,054 A | 2/1970 | Baigas | |

(Continued)

FOREIGN PATENT DOCUMENTS

AT 93 557 B 8/1989

(Continued)

OTHER PUBLICATIONS

"Bicomponent Fibers", available at http://web.utk.edu/~mse/pages/Textiles/Bicomponent%20fibers.htm, Updated Apr. 2004, 8 pages.

(Continued)

*Primary Examiner*—Cheryl Juska
(74) *Attorney, Agent, or Firm*—Sheridan Ross P.C.

(57) ABSTRACT

The articles of the present invention are directed to flocked articles having a plurality of conductively coated concentric multi-component flock fibers. The flock fibers are: adhered between a release adhesive layer and a permanent adhesive layer; orientated substantially perpendicular to the release adhesive and permanent adhesive layers; and maintained substantially parallel to one another along their entire length. In one embodiment the multi-component flock fibers are bi-component fibers having an outer polymer composition of poly(cyclohexylene-dimethylene terephthalate).

20 Claims, 15 Drawing Sheets

U.S. PATENT DOCUMENTS

| | | |
|---|---|---|
| 3,529,986 A | 9/1970 | Kappas et al. |
| 3,565,742 A | 2/1971 | Stephens et al. |
| 3,622,434 A | 11/1971 | Newman |
| 3,630,990 A | 12/1971 | Neal |
| 3,644,267 A | 2/1972 | Jackson, Jr. et al. |
| 3,654,232 A | 4/1972 | Jackson, Jr. et al. |
| 3,657,060 A | 4/1972 | Haigh |
| 3,660,200 A | 5/1972 | Anderson et al. |
| 3,674,611 A | 7/1972 | Petry et al. |
| 3,734,813 A | 5/1973 | Pohl |
| 3,772,132 A | 11/1973 | Dulin, Jr. |
| 3,775,205 A | 11/1973 | Hermann et al. |
| 3,793,050 A | 2/1974 | Mumpower, Jr. |
| 3,803,453 A * | 4/1974 | Hull ............... 361/220 |
| 3,816,060 A | 6/1974 | Koskolos |
| 3,816,211 A | 6/1974 | Haigh |
| 3,837,946 A | 9/1974 | Gribbin |
| 3,900,676 A * | 8/1975 | Alderson ............... 428/372 |
| 3,903,331 A | 9/1975 | Klein |
| 3,917,883 A | 11/1975 | Jepson |
| 3,936,554 A | 2/1976 | Squier |
| 3,956,552 A | 5/1976 | Geary |
| 3,961,116 A | 6/1976 | Klein |
| 3,969,559 A * | 7/1976 | Boe ............... 428/87 |
| 3,979,538 A | 9/1976 | Gilman et al. |
| 3,989,869 A | 11/1976 | Neumaier et al. |
| 4,018,956 A | 4/1977 | Casey |
| 4,025,678 A | 5/1977 | Frank |
| 4,034,134 A | 7/1977 | Gregorian et al. |
| 4,035,532 A | 7/1977 | Gregorian et al. |
| 4,062,992 A | 12/1977 | Power et al. |
| 4,079,047 A | 3/1978 | Jackson, Jr. et al. |
| 4,088,708 A | 5/1978 | Riew |
| 4,098,946 A | 7/1978 | Fuzek |
| 4,102,562 A | 7/1978 | Harper et al. |
| 4,104,439 A | 8/1978 | Fuzek |
| 4,110,301 A | 8/1978 | Zannucci et al. |
| 4,120,713 A | 10/1978 | Jensen et al. |
| 4,142,929 A | 3/1979 | Otomine et al. |
| 4,160,851 A | 7/1979 | Lienert et al. |
| 4,201,810 A | 5/1980 | Higashiguchi |
| 4,216,281 A | 8/1980 | O'Rell et al. |
| 4,218,501 A | 8/1980 | Kameya et al. |
| 4,269,885 A | 5/1981 | Mahn |
| 4,273,817 A | 6/1981 | Matsuo et al. |
| 4,282,278 A | 8/1981 | Higashiguchi |
| 4,292,100 A | 9/1981 | Higashiguchi |
| 4,294,641 A | 10/1981 | Reed et al. |
| 4,299,015 A | 11/1981 | Marcus et al. |
| 4,308,296 A | 12/1981 | Chitouras |
| 4,314,813 A | 2/1982 | Masaki |
| 4,314,955 A | 2/1982 | Boden et al. |
| 4,340,623 A | 7/1982 | Justus |
| 4,340,632 A | 7/1982 | Wells et al. |
| 4,352,924 A | 10/1982 | Wooten et al. |
| 4,362,773 A | 12/1982 | Shikinami |
| 4,369,157 A | 1/1983 | Conner |
| 4,385,588 A | 5/1983 | Bennetot |
| 4,387,214 A | 6/1983 | Passmore et al. |
| 4,388,134 A | 6/1983 | Long et al. |
| 4,390,387 A | 6/1983 | Mahn |
| 4,396,662 A | 8/1983 | Higashiguchi |
| 4,405,401 A | 9/1983 | Stahl |
| 4,418,106 A | 11/1983 | Landler et al. |
| 4,423,106 A | 12/1983 | Mahn |
| 4,430,372 A | 2/1984 | Knoke et al. |
| 4,438,533 A | 3/1984 | Hefele |
| 4,465,723 A | 8/1984 | Knoke et al. |
| 4,539,166 A | 9/1985 | Richartz et al. |
| 4,574,018 A | 3/1986 | Masuda et al. |
| 4,578,453 A | 3/1986 | Jackson, Jr. et al. |
| 4,582,658 A | 4/1986 | Reichmann et al. |
| 4,588,629 A | 5/1986 | Taylor |
| 4,650,533 A | 3/1987 | Parker et al. |
| 4,652,478 A | 3/1987 | Maii |
| 4,668,323 A | 5/1987 | Lenards et al. |
| 4,681,791 A | 7/1987 | Shibahashi et al. |
| 4,687,527 A | 8/1987 | Higashiguchi |
| 4,741,791 A | 5/1988 | Howard et al. |
| 4,790,306 A | 12/1988 | Braun et al. |
| 4,793,884 A | 12/1988 | Horikiri |
| 4,797,320 A | 1/1989 | Kopp et al. |
| 4,810,321 A | 3/1989 | Wank et al. |
| 4,810,549 A | 3/1989 | Abrams et al. |
| 4,812,247 A | 3/1989 | Fahner et al. |
| 4,812,357 A | 3/1989 | O'Rell et al. |
| 4,834,502 A | 5/1989 | Bristol et al. |
| 4,859,732 A | 8/1989 | Minnick |
| 4,861,644 A | 8/1989 | Young et al. |
| 4,894,404 A | 1/1990 | Minnick |
| 4,895,748 A | 1/1990 | Squires |
| 4,906,464 A | 3/1990 | Yamamoto et al. |
| 4,931,125 A | 6/1990 | Volkmann et al. |
| 4,938,955 A | 7/1990 | Niira et al. |
| 4,938,958 A | 7/1990 | Niira et al. |
| 4,972,015 A | 11/1990 | Carico et al. |
| 4,980,216 A | 12/1990 | Römpp |
| 4,981,750 A | 1/1991 | Murphy et al. |
| 5,008,130 A | 4/1991 | Lenards |
| 5,009,950 A | 4/1991 | Wagner et al. |
| 5,021,289 A | 6/1991 | Light et al. |
| 5,026,591 A | 6/1991 | Henn et al. |
| 5,041,104 A | 8/1991 | Seal |
| 5,043,375 A | 8/1991 | Henning et al. |
| 5,047,103 A | 9/1991 | Abrams et al. |
| 5,053,179 A | 10/1991 | Masui et al. |
| 5,059,452 A | 10/1991 | Squires |
| 5,066,537 A | 11/1991 | O'Rell et al. |
| 5,077,116 A * | 12/1991 | Lefkowitz ............... 428/141 |
| 5,106,944 A | 4/1992 | Sublett |
| 5,108,530 A | 4/1992 | Niebling, Jr. et al. |
| 5,115,104 A | 5/1992 | Bunyan |
| 5,144,334 A | 9/1992 | Suzuki et al. |
| 5,154,871 A | 10/1992 | Wagner et al. |
| 5,198,277 A | 3/1993 | Hamilton et al. |
| 5,207,851 A | 5/1993 | Abrams |
| 5,217,563 A | 6/1993 | Niebling et al. |
| 5,217,781 A | 6/1993 | Kuipers |
| 5,219,941 A | 6/1993 | Meyer, Jr. et al. |
| 5,239,020 A | 8/1993 | Morris |
| 5,248,536 A | 9/1993 | Du Katz |
| 5,274,039 A | 12/1993 | Sirinyan et al. |
| 5,302,223 A | 4/1994 | Hale |
| 5,306,567 A | 4/1994 | Kuo et al. |
| 5,342,892 A | 8/1994 | Vanderbilt et al. |
| 5,346,746 A | 9/1994 | Abrams |
| 5,347,927 A | 9/1994 | Berna et al. |
| 5,348,699 A | 9/1994 | Meyer et al. |
| 5,350,474 A | 9/1994 | Yamane |
| 5,350,830 A | 9/1994 | Kuo et al. |
| 5,352,507 A | 10/1994 | Bresson et al. |
| 5,358,789 A | 10/1994 | Kuo et al. |
| 5,378,796 A | 1/1995 | George et al. |
| 5,382,628 A | 1/1995 | Stewart et al. |
| 5,383,996 A | 1/1995 | Dressler |
| 5,385,773 A | 1/1995 | Yau et al. |
| 5,393,609 A | 2/1995 | Chang et al. |
| 5,395,692 A | 3/1995 | White et al. |
| 5,428,086 A | 6/1995 | Minnick et al. |
| 5,431,501 A | 7/1995 | Hale et al. |
| 5,432,230 A | 7/1995 | Vanderbilt et al. |
| 5,439,987 A | 8/1995 | Scott et al. |
| 5,442,036 A | 8/1995 | Beavers et al. |
| 5,451,626 A | 9/1995 | Kumaki et al. |

| | | |
|---|---|---|
| 5,464,909 A | 11/1995 | Chang et al. |
| 5,485,614 A | 1/1996 | Kocis et al. |
| 5,487,614 A | 1/1996 | Hale |
| 5,488,907 A | 2/1996 | Xu et al. |
| 5,489,359 A | 2/1996 | Yamane |
| 5,522,317 A | 6/1996 | Hale et al. |
| 5,529,650 A | 6/1996 | Bowers et al. |
| 5,534,099 A | 7/1996 | Yamamoto |
| 5,555,813 A | 9/1996 | Hale et al. |
| 5,556,669 A | 9/1996 | Sasaki et al. |
| 5,575,877 A | 11/1996 | Hale et al. |
| 5,590,600 A | 1/1997 | Hale et al. |
| 5,597,637 A | 1/1997 | Abrams et al. |
| 5,601,023 A | 2/1997 | Hale et al. |
| 5,622,587 A | 4/1997 | Barthelman |
| 5,640,180 A | 6/1997 | Hale et al. |
| 5,642,141 A | 6/1997 | Hale et al. |
| 5,644,988 A | 7/1997 | Xu et al. |
| 5,654,395 A | 8/1997 | Jackson, Jr. et al. |
| 5,693,400 A | 12/1997 | Hamilton et al. |
| 5,734,396 A | 3/1998 | Hale et al. |
| 5,746,816 A | 5/1998 | Xu |
| 5,762,379 A | 6/1998 | Salmon et al. |
| 5,766,397 A | 6/1998 | Jones |
| 5,771,796 A | 6/1998 | Morrison et al. |
| 5,804,007 A | 9/1998 | Asano |
| 5,830,263 A | 11/1998 | Hale et al. |
| 5,858,156 A | 1/1999 | Abrams et al. |
| 5,866,248 A | 2/1999 | Dressler |
| 5,900,096 A | 5/1999 | Zemel |
| 5,909,021 A | 6/1999 | Duffy |
| 5,912,065 A | 6/1999 | Kukoff |
| 5,922,436 A | 7/1999 | Banfield et al. |
| 5,942,311 A | 8/1999 | Scianna |
| 5,981,009 A | 11/1999 | Iacono et al. |
| 5,981,021 A | 11/1999 | McCulloch |
| 6,010,764 A | 1/2000 | Abrams |
| 6,025,068 A | 2/2000 | Pekala |
| 6,083,332 A | 7/2000 | Abrams |
| 6,102,686 A | 8/2000 | Eschenfelder |
| 6,103,041 A | 8/2000 | Wagner et al. |
| 6,105,502 A | 8/2000 | Wagner et al. |
| 6,110,560 A | 8/2000 | Abrams |
| 6,113,149 A | 9/2000 | Dukatz |
| 6,114,023 A | 9/2000 | Schwarz et al. |
| 6,146,485 A | 11/2000 | Iacono et al. |
| 6,152,038 A | 11/2000 | Wagner et al. |
| 6,170,881 B1 | 1/2001 | Salmon et al. |
| 6,171,678 B1 | 1/2001 | Holeschovsky et al. |
| 6,202,549 B1 | 3/2001 | Mitsam et al. |
| 6,224,707 B1 | 5/2001 | Lion |
| 6,247,215 B1 | 6/2001 | Van Alboom et al. |
| 6,249,297 B1 | 6/2001 | Lion |
| 6,257,866 B1 | 7/2001 | Fritz et al. |
| 6,264,775 B1 | 7/2001 | Holeschovsky et al. |
| 6,277,312 B1 | 8/2001 | Hansen et al. |
| 6,296,908 B1 | 10/2001 | Reihs et al. |
| 6,299,715 B1 | 10/2001 | Langsdorf et al. |
| 6,341,856 B1 | 1/2002 | Thompson et al. |
| 6,348,939 B1 | 2/2002 | Xu et al. |
| 6,350,504 B1 | 2/2002 | Alboom et al. |
| 6,376,041 B1 | 4/2002 | Morrison et al. |
| 6,387,472 B1 | 5/2002 | Reck et al. |
| 6,402,313 B1 | 6/2002 | Xu et al. |
| 6,425,331 B1 | 7/2002 | Xu et al. |
| 6,428,877 B1 | 8/2002 | Suss et al. |
| 6,436,506 B1 | 8/2002 | Pinter et al. |
| 6,439,710 B1 | 8/2002 | Hale et al. |
| 6,447,629 B1 | 9/2002 | Thompson et al. |
| 6,450,098 B1 | 9/2002 | Hale et al. |
| 6,451,148 B1 | 9/2002 | Jenner |
| 6,486,903 B1 | 11/2002 | Wagner et al. |
| 6,488,370 B2 | 12/2002 | Hale et al. |
| 6,540,345 B1 | 4/2003 | Wagner et al. |
| 6,544,634 B1 | 4/2003 | Abrams et al. |
| 6,631,984 B2 | 10/2003 | Thompson et al. |
| 6,648,926 B1 | 11/2003 | Immediato |
| 6,660,352 B2 | 12/2003 | Hsu et al. |
| 6,676,796 B2 | 1/2004 | Pinter et al. |
| 6,787,589 B2 | 9/2004 | Weaver et al. |
| 6,818,293 B1 | 11/2004 | Keep et al. |
| 6,836,915 B2 | 1/2005 | Song et al. |
| 6,929,771 B1 | 8/2005 | Abrams |
| 6,972,305 B1 | 12/2005 | Griessmann et al. |
| 7,229,680 B1 | 6/2007 | Crompton |
| 2001/0008039 A1 | 7/2001 | Alboom et al. |
| 2001/0008672 A1 | 7/2001 | Norvell et al. |
| 2002/0009571 A1 | 1/2002 | Abrams |
| 2002/0098329 A1 | 7/2002 | Abrams |
| 2003/0072889 A1 | 4/2003 | Abrams |
| 2003/0129353 A1 | 7/2003 | Abrams |
| 2003/0186019 A1 | 10/2003 | Abrams |
| 2003/0203152 A1 | 10/2003 | Higgins et al. |
| 2003/0207072 A1* | 11/2003 | Abrams ................. 428/90 |
| 2003/0211279 A1 | 11/2003 | Abrams |
| 2004/0050482 A1* | 3/2004 | Abrams ................. 156/228 |
| 2004/0053001 A1* | 3/2004 | Abrams ................. 428/90 |
| 2004/0055692 A1* | 3/2004 | Abrams ................. 156/72 |
| 2004/0058120 A1 | 3/2004 | Abrams |
| 2004/0081791 A1* | 4/2004 | Abrams ................. 428/90 |
| 2004/0170799 A1 | 9/2004 | Carr et al. |
| 2004/0214493 A1 | 10/2004 | Smith |
| 2004/0214495 A1 | 10/2004 | Foss et al. |
| 2005/0081985 A1 | 4/2005 | Abrams |
| 2005/0158508 A1 | 7/2005 | Abrams |
| 2005/0196594 A1 | 9/2005 | O'Rell et al. |
| 2005/0266204 A1 | 12/2005 | Abrams |
| 2005/0268407 A1 | 12/2005 | Abrams |
| 2006/0026778 A1 | 2/2006 | Lion |
| 2006/0029767 A1 | 2/2006 | Lion |
| 2006/0251852 A1 | 11/2006 | Abrams |
| 2007/0003761 A1* | 1/2007 | Miyazono et al. ........ 428/375 |
| 2007/0022548 A1 | 2/2007 | Abrams |
| 2007/0026189 A1 | 2/2007 | Abrams |
| 2007/0102093 A1 | 5/2007 | Abrams |
| 2007/0110949 A1 | 5/2007 | Abrams |
| 2007/0148397 A1 | 6/2007 | Abrams |

FOREIGN PATENT DOCUMENTS

| | | |
|---|---|---|
| AT | 135 427 T1 | 9/1992 |
| AU | 606651 | 2/1988 |
| AU | 653994 | 3/1992 |
| BE | 0506601 | 9/1992 |
| CA | 757595 | 4/1967 |
| CA | 2010076 | 8/1990 |
| CA | 1306411 | 8/1992 |
| CA | 2064300 | 9/1992 |
| DE | 3883517 T2 | 8/1989 |
| DE | 69208910 T2 | 9/1992 |
| DE | 19734316 A1 | 2/1999 |
| DK | EP 0506601 T3 | 9/1992 |
| EP | FR 2543984 | 4/1983 |
| EP | 0122656 | 10/1984 |
| EP | 0210304 A1 | 2/1987 |
| EP | 0280296 A3 | 8/1988 |
| EP | 0351079 A3 | 1/1990 |
| EP | 0506601 B1 | 3/1992 |
| EP | 0685014 B1 | 6/1995 |
| EP | 0913271 | 10/1998 |
| EP | 0989227 A2 | 3/2000 |
| FR | 1480860 | 5/1967 |
| FR | 2210149 | 7/1974 |
| FR | 9002623 | 3/1990 |
| FR | 2659094 A1 | 9/1991 |
| FR | 2784619 A1 | 4/2000 |

| | | |
|---|---|---|
| FR | 2846202 | 4/2004 |
| GB | 1171296 | 11/1969 |
| GB | 1447049 | 8/1976 |
| GB | 1466271 | 3/1977 |
| GB | 2065031 A | 6/1981 |
| GB | 2126951 A | 4/1984 |
| GB | 2227715 | 8/1990 |
| GB | 2214869 B | 12/1991 |
| GB | 0506601 | 9/1992 |
| IE | 55104 | 4/1984 |
| IT | 286498BE/93 | 8/1989 |
| IT | 24637BE/96 | 6/1996 |
| JP | 52155270 | 12/1977 |
| JP | 54163934 | 12/1979 |
| JP | 56108565 A | 1/1980 |
| JP | 55079143 A * | 6/1980 |
| JP | 55147171 | 11/1980 |
| JP | 56058824 A | 5/1981 |
| JP | 56107080 A * | 8/1981 |
| JP | 56108565 | 8/1981 |
| JP | 56141877 A2 | 11/1981 |
| JP | 58062027 A | 4/1983 |
| JP | 59106944 A | 6/1984 |
| JP | 59115885 A | 7/1984 |
| JP | 60236738 | 11/1985 |
| JP | 5201196 | 8/1993 |
| JP | 10059790 | 3/1998 |
| JP | 2000084977 | 3/2000 |
| JP | 2001270019 | 10/2001 |
| KR | 220373 | 6/1999 |
| KR | 2003063833 | 7/2003 |
| NO | 306099 | 6/1989 |
| SE | 329767 | 8/1989 |
| TW | 62640 | 7/1993 |
| WO | WO 79/01146 | 12/1979 |
| WO | PCT/US88/02828 | 8/1988 |
| WO | WO 89/01829 | 3/1989 |
| WO | WO 90/09289 | 8/1990 |
| WO | WO 94/19530 | 9/1994 |
| WO | WO 02/07959 A1 | 1/2002 |
| WO | WO 02/107959 | 1/2002 |
| WO | WO 02/09925 A1 | 2/2002 |
| WO | WO 02/058854 A1 | 8/2002 |
| WO | WO 03/031083 A1 | 4/2003 |
| WO | WO 2004/005023 | 1/2004 |
| WO | WO 2004/005413 | 1/2004 |
| WO | WO 2004/005600 | 1/2004 |
| WO | WO 2004005023 A1 * | 1/2004 |
| WO | WO 2005/035235 | 4/2005 |
| WO | WO 2005/118948 | 12/2005 |
| ZA | 88/6259 | 4/1990 |
| ZA | 92/2154 | 2/1993 |

OTHER PUBLICATIONS

Abrams, Brown, "Flocking A Touch of Velour" ScreenPrinting (Apr. 1987).
Abrams, Brown, "Part II: Flocking" ScreenPrinting (Jun. 1987).
Automotive & Industrial Division: Web & Powder Adhesives—Bostik USA; 2000; 2 pgs.
Bayer Plastics Division Press Release, "Wheel Covers, Center Caps Become Revolving Art Forms with New Film Insert Molding Technology" (Jun. 19, 2000), 4 pages.
Bostik USA; "Industrial Adhesives" (2001), 3 pages.
Bostik USA; Web & Powder Adhesives; 2000.
Cohn, Larry, "When Is A 'Dye Sublimation' Printer Not A 'Dye Sublimation' Printer?" Fun Faces Foto Gifts (Oct. 2001), available at http://www.dyesub.org/articles/dyesubprinter.htm, 7 pages.
Corterra Polymers,—(printed Mar. 8, 2004) http://www.swicofil.com/ptt.html, 4 pages.
Cutting-Edge Germ Weapon from Ancient World—KM Communications (May 10, 2003), available at http://www.newswise.com/articles/2003/5/ANTMCRBL.KMC.html, 2 pages.
Declaration of L. Brown Abrams Under 37 CFR § 1.132 for U.S. Appl. No. 09/621,830 dated Jan. 7, 2003.
Declaration of L. Brown Abrams Under 37 CFR § 1.98 for U.S. Appl. No. 09/735,721 dated Jan. 16, 2004, 2 pages.
Declaration of L. Brown Abrams under 37 CFR § 1.98 for U.S. Appl. No. 10/394,357 dated Jan. 16, 2004, 4 pages with Appendix A-I.
Declaration of L. Brown Abrams Under 37 CFR § 1.132 for U.S. Appl. No. 09/735,721 dated Jan. 7, 2003.
Declaration of L. Brown Abrams Under 37 CFR § 1.98 Executed Nov. 22, 2003 for U.S. Appl. No. 10/614,340, filed Jul. 3, 2003.
Defosse, Matthew, "Systems Approach Gives Blow Molders Big Edge," www.modplas.com (Dec. 2000).
Derrick, Cherie, "Sublimation, what is it?" Encompass Technologies (Oct. 2000), available at http://www.dyesub.org/articles/dyesubwhatisit.htm, 3 pages.
Disperse Dyes for Textiles, Organic Dyestuffs Corporation (2003), available at http://www.organicdye.com/textiledisperseindex.asp, 4 pages.
Eastman PCT Polyester, "New Resins, New Services" (undated), 5 pages.
Eastman News Archive, DuPoint Engineering Polymers Acquires High Performance Plastics Business from Eastman, printed Jul. 3, 2003, 2 pages.
Eastman, "Need? A Polyester Fiber with these attributes . . . " (undated), 11 pages.
Engineering of Wool Carpet Yarns: Yarn Bonding Technology, Wools of New Zealand (2002), available at http://www.canesis.com/Documents/Yarn_bonding_technology.pdf, pp. 1-17.
Excerpts from Obsolete Type 200 Series Brochure, undated, 3 pages.
Fabric Processing Guidelines and Expected Product Attributes, Wellman, Inc., The Fibers Division (Jul. 25, 2001), 8 pages.
Ford, Don, "Inkjet Transfer Printing (not dye sublimation)," Fords Screen Printing (Oct. 2001), available at http://www.dyesub.org/articles/inkjet.shtm, 2 pages.
GE Structured Products, "Lexan® In-Mold Films: A Guide for Designing, Forming and Molding with Screenprinted Lexan® Films" (undated), pp. 1-20.
Griffin, Patrick, J., "Film Insert Molding," SGIA Journal, First Quarter 2001, pp. 31-36.
Hettinga: Plastics Technology for the Future, Available Today!—website (circa 2000), 4 pages.
Krichevskii, G.E., "Textile Materials Made from Polyester Fibres—a Most Difficult Material to Color," Fibre Chemistry, vol. 33, No. 5 (Sep. 2001), pp. 364-367(4).
Lou Reade Reports "Surface Attention" European Plastics News (May 2003), p. 26.
Matsco, Mark et al., "Film Insert Molding Technology", Automotive & Transportation Interiors Expo Conference, 1997.
Peterson, Jeff, "New Innovations in 3D Curved Parts Decorating," Plastics Decorating (Oct.-Nov. 2001), available at http://www.petersonpublications.com/plasticsdecorating/articlesdisplay.asp?ID=17, 3 pages.
Sawgrass Technologies, Inc. Press Releases, available at http://www.sawgrassink.com/pressreleases/pressreleasearchives.htm, printed Jan. 22, 2004, 18 pages.
Saxon Screens—Products, www.saxon-screens.de/airmboss.html, 5 pages (Nov. 22, 2004).
Sean O'Leary, "Standard Transfer vs. Dye Sublimation: Requirements and Conditions for the Two Processes," The Big Picture Magazine, available at http://www.signweb.com/digital/tips/digitaltip7.html, 2 pages, date unknown.
Shaner, Ken, "Advanced Molding Processes: Low Pressure Molding/Low-High Pressure Molding for Interior Trim," Automotive & Transportation Interior Expo Conference 1997, Session 9, pp. 1-2.
Snyder, Merle R., "Fabric Molding Shows Promise in Automotive: Machine Makers Offer Innovative Systems That Boost Productivity and Facilitate Recyclability," Modern Plastics (Oct. 1999), available at http://www.modplas.com/new/month_1099/ms10.htm.
Sonics & Materials, Inc., "Chart II Compatability of Thermoplastics" (undated), 1 page.
Takatori, Hiroyuki, "Dieprest In-mold Laminate Technology," Automotive & Transportation Interiors Expo Conference 1999, Session 12, pp. 1-4.

DuPont Thermx PCT Product and Properties Guide brochure dated Aug. 2003.

"Fiber Innovation Technology: Bicomponent Fibers", found at http://www.fitfibers.com/bicomponent_fibers.htm, undated (3 pages).

U.S. Appl. No. 29/058,551, filed Aug. 19, 1996, Abrams.

U.S. Appl. No. 09/548,839, filed Apr. 13, 2000, Abrams.

U.S. Appl. No. 09/621,830, filed Jul. 24, 2000, Abrams.

U.S. Appl. No. 11/460,493, filed Jul. 27, 2006, Abrams.

"Flockin' to Precision"; Images Magazine; Feb. 1992, 1 page.

"Metallic pigment dispersions, pellets and powders for Inks"; Eckart, undated, 28 pages.

Cellusuede Products, Inc, "About Flock", Available at http://www.cellusuede.com/navabout.html, KMK Media Group, copyright 2000, 1 pages.

Cellusuede Products, Inc, "FAQ's", Available at http://www.cellusuede.com/faq.html, KMK Media Group, copyright 2000, 2 pages.

Cellusuede Products, Inc, "Fiber Types", Available at http://www.cellusuede.com/about/types.html, KMK Media Group, copyright 2000, 4 pages.

Cellusuede Products, Inc, "Glossary of Terms", Available at http://www.cellusuede.com/glossary/index.html, KMK Media Group, copyright 2000, 2 pages.

Cellusuede Products, Inc, "Uses for Flock, Home Furnishings", Available at http://www.cellusuede.com/home.html, KMK Media Group, copyright 2000, 2 pages.

Declaration of L. Brown Abrams under 37 CFR § 1.98 for U.S. Appl. No. 09/621,830 dated Jan. 16, 2004, 2 pages.

Declaration of L. Brown Abrams under 37 CFR § 1.98 for U.S. Appl. No. 10/394,357 dated Jan. 3, 2007, 4 pages with Appendix A-I.

Second Supplemental Declaration of L. Brown Abrams under 37 CFR § 1.32 for U.S. Appl. No. 09/548,839, executed Jan. 7, 2003.

Supplemental Declaration of L. Brown Abrams under 37 CFR § 1.132 for U.S. Appl. No. 09/548,839 executed Oct. 23, 2002.

* cited by examiner

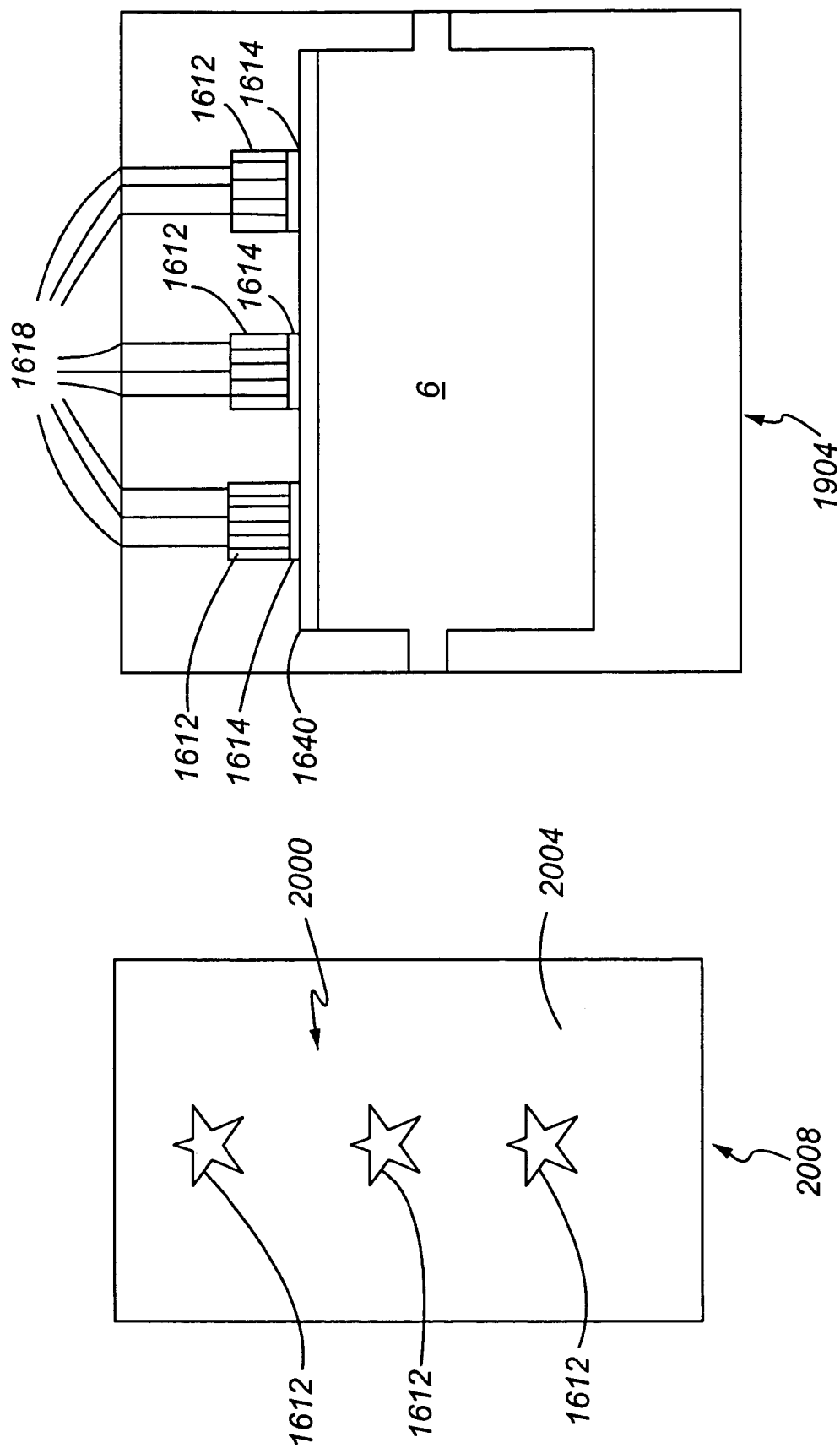

PROCESS FOR PRINTING AND MOLDING A FLOCKED ARTICLE

CROSS REFERENCE TO RELATED APPLICATIONS

The present application claims the benefits under 35 U.S.C. § 119 of U.S. Provisional Patent Application Ser. No. 60/537,110, filed Jan. 16, 2004, of the same title and to the same inventor, which is incorporated herein by this reference.

FIELD OF THE INVENTION

The present invention is related generally to printing of flocked articles and specifically to sublimation printing of flocked articles.

BACKGROUND OF THE INVENTION

Flock is used in the manufacture of numerous types of articles, such as textiles. Such articles are typically manufactured by electrostatically depositing the flock onto the desired surface. In one process, the desired surface is a release-adhesive coated sacrificial carrier sheet. The free ends of the flock are contacted with an adhesive. This structure, also known as a transfer, is thermally applied to the substrate. In another process, the desired surface is a permanent adhesive or the substrate itself. This process is known as direct flocking. The direct flocked structure generally does not include a carrier sheet and release adhesive.

Flock fibers are either pre-dyed (before application to the desired surface) or post-dyed (after application to the surface). Post-dyeing is typically effected by sublimation dying techniques in which the flock and dye are heated so that the vaporized dye is transferred to the flock fiber. A sublimation print in the desired design typically carries the dye for transfer to the flock either by inkjet or heat transfer techniques. As used herein, "sublimation" refers to a process where an image is printed by turning dye, ink or toner by heat and/or pressure into a gas which then impregnates itself into a substrate or a coating on a substrate.

The use of sublimation printing of flock has generally not been widely practiced for various reasons. Some polyesters, such as poly(ethylene terephthalate), can hold the dye but have little loft retention and flatten out during sublimation printing. Other polyesters typically melt or soften and deform under the high temperatures experienced during sublimation printing, losing desirable tactile characteristics (soft touch). Nylon and rayon fibers, though having loft retention, generally are unable to accept the vaporized dye consistently and/or permanently and therefore produce an irregular and/or unstable colored product.

SUMMARY OF THE INVENTION

These and other needs are addressed by the various embodiments and configurations of the present invention. The processes and articles of the present invention use a variety of thermally stable and loft retentive polymers in sublimation printed flock fibers, which are highly attractive for molded resin articles. In one embodiment, a portion of the flock fibers comprise poly(cyclohexylene-dimethylene terephthalate) ("PCT"), which includes modified forms of PCT such as Thermx PCTA™ manufactured by Eastman Chemical Company. In another embodiment, the flock fibers comprise a concentric sheath/core multi-component fiber, such as PCT/Poly(Ethylene Terephthalate) or PET, PET/PET, PCT/PolyPropylene or PP, High Density PolyEthylene or HDPE/PET, Linear Low Density PolyEthylene or LLDPE/PET, and nylon 6/nylon 66.

The flock of the present invention comprises a printable flocking material. Typically, the flocking material is a white polyester or other synthetic fiber. A suitable dye or pigment is applied to the flock to cause dying or coloration of the flock after application to the underlying (or overlying) layer (depending on the order in which the various layers are deposited). The dyes or pigments include sublimation dyes (as noted above), acid dye inks, and pigment dyes. Sublimation is a preferred technique to provide desired color patterns to the design due to the superior feel of the design. The colored fibers in the design have a softer feel than fibers colored using other techniques or of other compositions. A softer feel is more attractive to consumers in many applications. The dye is more colorfast on the fiber as the dye is absorbed into the fiber matrix at high temperature and fixed by the fiber as opposed to simply being a surface coat on the fiber. Unlike sublimation dyes, non-sublimation dyes, such as acid dye inks, generally must be cured after application, such as by steam curing (which can be impractical and cumbersome).

The flock of the present invention, when combined with the various flocking/molding techniques set forth herein, makes it possible to obtain a wide format design inexpensively and in high volumes. Such designs are particularly attractive when combined with highly resilient flock such as PCT-containing flock and certain composites, such as concentric sheath/core bicomponent fibers.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIG. 20 is a plan view of a mold insert according to another embodiment of the present invention;

FIG. 21 is a side view of a mold containing the mold insert of FIG. 20;

DETAILED DESCRIPTION

Sublimation Printed Articles

The various embodiments of the present invention utilize a thermally stable multi-component fiber with various discrete regions of polymer, copolymer, or polymer blend components as the flocking fiber. As set forth in U.S. Pat. Nos. 6,249,297 and 6,224,707, sublimation printing typically heats and applies pressure to the flocked article to permit dye to be transferred and heat set via the vapor phase from a substrate to the fiber. Many polyester fibers, such as polyethylene terephthalate, nylon, and rayon soften at such temperatures/pressures and/or have poor loft retention, because of the temperature and pressure required for sublimation dye to transfer and heat set, thereby causing an unattractive article and unpleasant surface to the touch.

The multi-component fibers of the present invention can overcome these limitations. The fibers typically include at least a core (or inner) material and a sheath (or outer) material. For sublimation printing, the sheath homopolymer, copolymer, terpolymer, or polymer blend or composite component preferably will accept dye, and the core homopolymer, copolymer, or polymer blend or composite component provides thermal stability. Preferably the core component has a melting point and softening point that are greater than and more preferably at least about 5% greater than the temperature to which the flock will be heated during sublimation printing (and, if applicable, molding) and is highly flexible and elastic with a high degree of shape memory (e.g., high percentage of shape recovery after compression). This temperature is typically at least about 340° F., more typically at least about 350° F., and even more typically ranges from about 350° F. to about 400° F. These features preferably are maintained despite the temperatures and pressures experienced during sublimation printing. The pressures experienced during sublimation printing typically are at least about 2 psi, and even more typically range from about 2 psi to about 30 psi.

Figure 15:
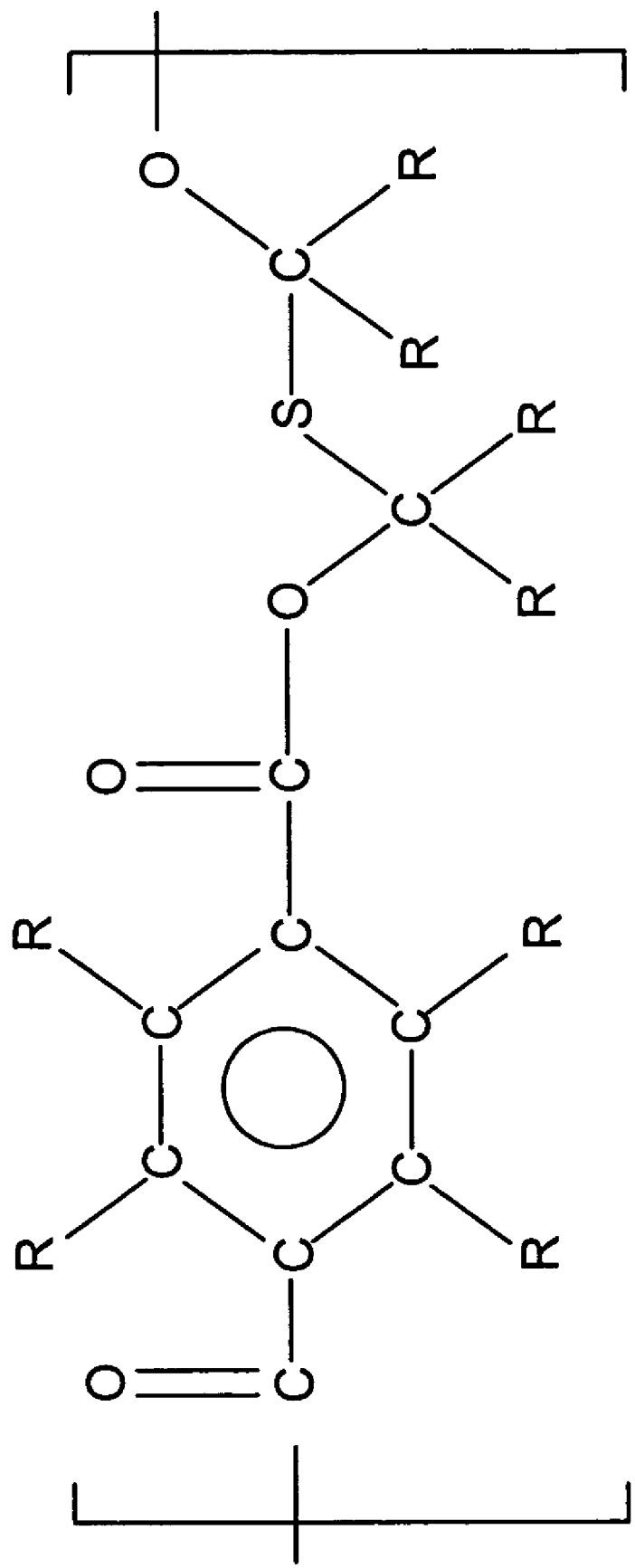
FIG. 15 depicts the chemical formula of a family of polymers including PCT.

In one embodiment, the fiber sheath and/or core comprises a polyester having the repeating unit formula set forth in FIG. 15. With reference to that figure, "R" represents independently hydrogen or a substituted or unsubstituted alkyl or aryl group and "S" is an aromatic or nonaromatic cyclic residue which can include one or more heteroatoms. In a particularly preferred embodiment, the flock comprises the polyester poly (cyclohexylene-dimethylene terephthalate) ("PCT"), with poly(1,4-cyclohexylene-dimethylene tereplithalate) being preferred and PCT polyester, such as Thermx™ or Thermx EG™, from Eastman Chemical Company being even more preferred. In this embodiment, the sheath and core materials can each include PCT with the sheath material being less crystalline than the core material. As will be appreciated, dye absorption is often greater for less crystalline (or more amorphous) materials. In this embodiment, the core and sheath materials include the same primary polymer component, namely PCT, but may contain other components to impact desired physical properties and/or have different molecular weight distributions.

Figure 22A:
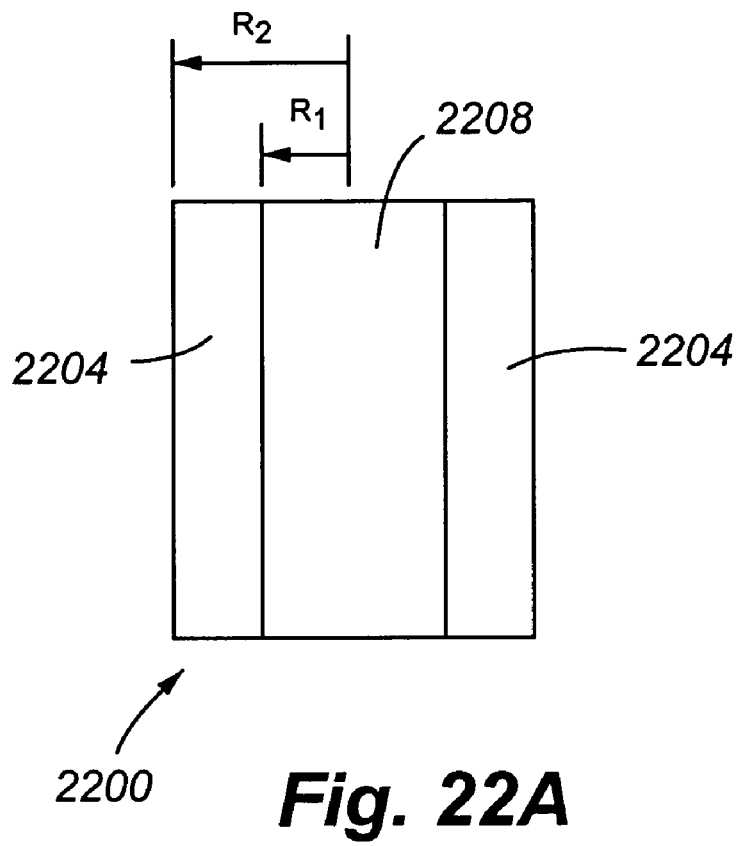
FIG. 22A is a cross-sectional view of a composite flock fiber according to another embodiment of the present invention.
Figure 22B:
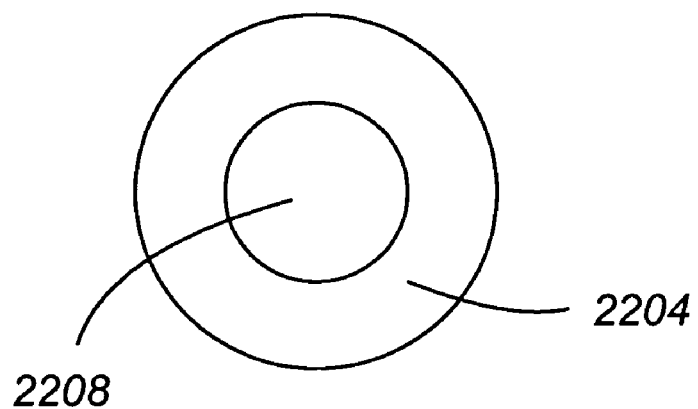
FIG. 22B is a top view of the composite flock fiber of FIG. 22A.

The flock fiber is preferably a concentric sheath/core bicomponent fiber, such as that fiber illustrated in FIG. 22. The fiber 2200 includes a core or inner polymer composition 2208 and a peripheral or outer sheath polymer composition 2204. The two compositions may have the same or different polymer components but differing properties, such as differing mechanical properties and molecular weight distributions, and/or the same or differing additives, such as plasticizers, blend compatible polymers, delusterants, dye stuffs, fillers, colorants, and the like. For example, the inner polymer composition 2208 can have a molecular weight distribution (number average and/or weight average molecular weight), melting and/or softening point, safe ironing temperature, glass transition temperature, tenacity, percent elongation, compression recovery, crystallinity, deflection temperature, elasticity, and/or work recovery that is/are higher than the corresponding characteristic(s) of the outer polymer composition 2204. In one exemplary configuration, the inner polymer composition 2208 preferably provides high degrees of resilience, elasticity, loft retention, and heat resistance similar to (and in some cases the same as) PCT while the outer polymer composition 2204 provides lesser degrees of resilience, loft retention, and/or heat resistance but higher degrees of dyeability (or the ability to accept sublimation dye). In another configuration, the inner polymer composition has a higher crystallinity than the outer polymer composition (which can be amorphous). Thus, the two polymer compositions provide differing, but generally complementary, chemical properties for sublimation printing applications. Examples of polymers suitable for the core polymer composition 2208 include homopolymers of nylon, rayon, Poly (Ethylene Terephthalate) or PET, Poly(Propylene) or PP, PCT, and/or copolymers and blends thereof, with nylon, rayon, and/or PCT being particularly preferred. Examples of polymers for the outer polymer composition comprise homopolymers of esters and copolymers and polymer blends thereof. Specific examples of such esters include PCT, PET, Poly(Ethylene) or PE, and/or PolyPropylene or PP. Examples of bicomponent flock fibers include the fibers sold under the trade names, T-201, T-202, T-203, T-204, T-207, T-215, T-225, T-230, T-231, T-235, T-236, T-250, T-251, T-252, T-260, T-270, T-271, T-502, T-512, and T-522 manufactured by Fiber Innovation Technology.

Referring to FIG. 22A, the relative amounts of the inner and outer polymer compositions can be important. Typically, the fiber 2200 will have a greater amount of the inner composition 2208 than the outer composition 2204. This will provide a bicomponent fiber which more strongly displays the mechanical properties of the inner composition 2208 than the outer composition 2204. Thus, the radius ($R_1$) of the inner composition 2208 is greater than the difference between the radius ($R_2$) of the outer fiber and the radius $R_1$. Typically, the fiber 2200 will include more than 50% by weight, more typically at least about 60% by weight, and even more typically from about 65 to about 90 percent by weight of the inner composition 2208.

Figure 23:
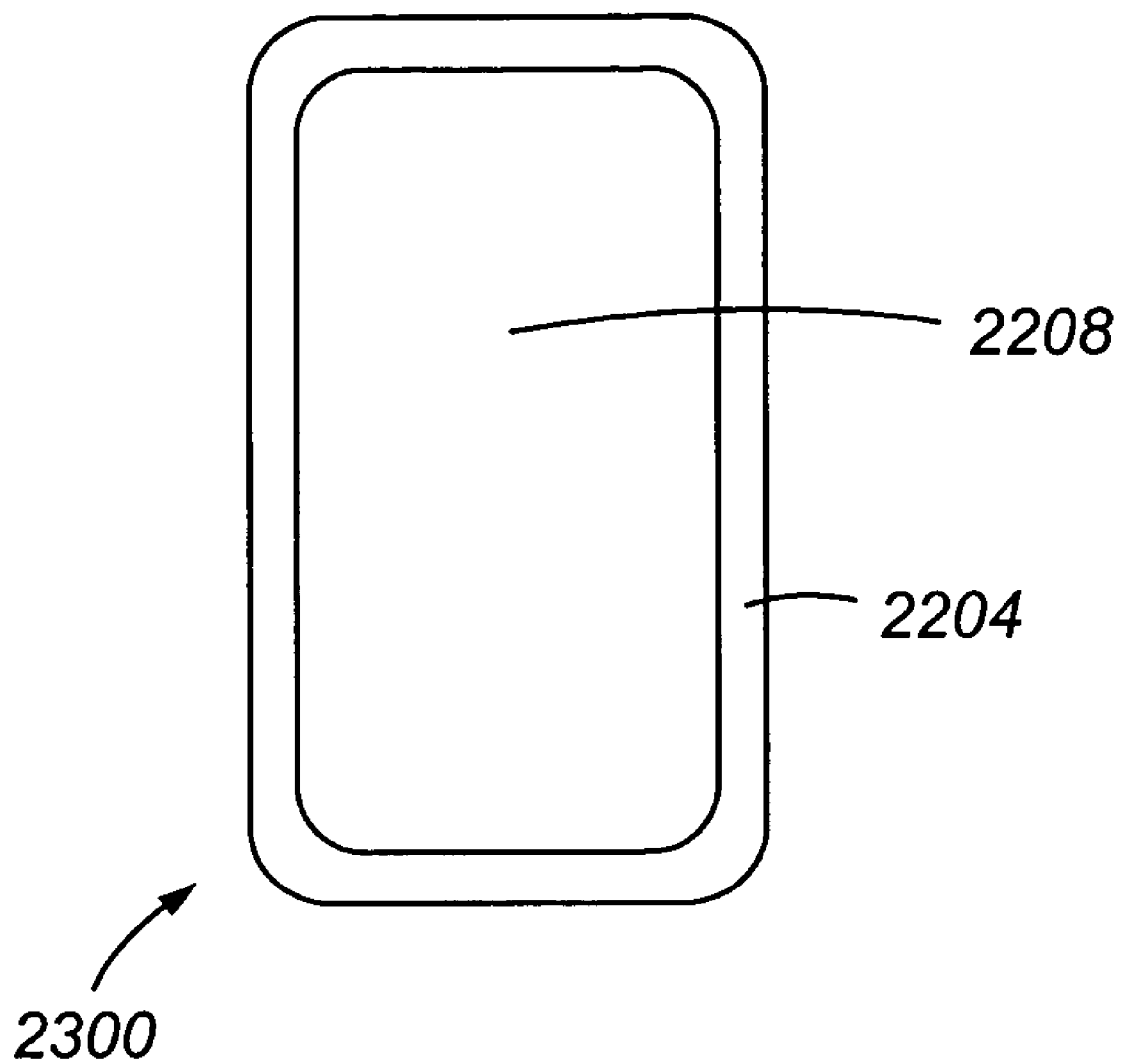
FIG. 23 is a cross-sectional view of a composite flock fiber according to another embodiment of the present invention.

FIG. 23 depicts a bicomponent fiber 2300 according to another embodiment. Unlike the fiber configuration of FIG. 22A, the bicomponent fiber 2300 has the outer composition 2204 surrounding the periphery of the inner composition 2208. This fiber configuration can provide better dye absorption characteristics than the fiber 2200.

PCT, when used in the sheath and/or core component compositions, can have a number of desirable characteristics for high temperature applications, such as sublimation printing and molding. Such properties (and the properties of other preferred polymers, copolymers, and polymer blends) include one or more of a melting point typically of at least about 200° C., more typically at least about 265° C., and even more typically about 290° C., a safe ironing temperature typically of at least about 150° C. and more typically of about 205° C., a glass transition temperature typically of at least about 75° C. and more typically of about 90° C., a tenacity typically of at least about 2.5 and typically ranging from about 2.5 to about 3.0, a percent elongation typically of at least about 25% and more typically of at least about 35%, a compression recovery (from 34.5 mPa) typically of at least about 30% and more typically about 44%, and a deflection temperature at 18.8 kg/square centimeter typically of at least about 215° C. and even more typically of at least about 220° C. The work recovery of PCT from a 2% extension is typically at least about 50 and more typically about 90, from 5% extension at least about 40 and more typically about 55, and from a 10% extension at least about 25 and more typically about 35. The shrinkage of PCT is typically less than about 1% in air at 190° C. and less than about 0.5% in water at 100° C. PCT and certain other bicomponent fiber sheath and/or core components also can have excellent resistance to chemicals such as mineral acids, hydroxides, and commonly used solvents. PCT and certain other bicomponent fiber sheath components may be provided with a conductive coating (that is deposited on the exterior of the outer composition 2204) to hold a charge, which is important for electrostatic flocking applications.

PCT and certain other bicomponent fiber sheath and/or core components can have a number of surprising and unexpected advantages relative to fibers of only polyethylene terephthalate ("PET"), nylon, or rayon in molding applications. PCT, for example, can have a higher melting point (290° C.) than nylon 6,6 (264° C.) and nylon 6 (223° C.), and PET (250° C.) and a higher deflection temperature for a selected applied pressure or force. PCT is more resilient than PET (e.g., PCT has a compression recovery of about 44% from 34.5 mPa while PET has a compression recovery of about 31% from 34.5 mPa).

Processes for manufacturing PCT and forming bicomponent fibers and other composites are known to those of ordinary skill in the art.

To provide thermal stability, the polymeric material in the inner composition 2208 should be highly crystallized. Typically, the polymer in the fiber is at least about 20%, more typically at least about 30%, and even more typically from about 30% to about 70% crystallized. To make this possible, preferably at least one of the extrusion temperature, drawing temperature, and heat set temperature is/are at least as high or higher than the maximum temperature experienced by the fiber in later processing, such as sublimation printing and molding. More preferably, the temperature is at least about 180° C., more preferably of at least about 190° C., even more preferably of at least about 200° C., and even more preferably of at least about 205° C. Where PCT is the core component, this temperature can be important to providing PCT with suitable properties for sublimation printing to "lock in" the resiliency. As will be appreciated, additives can be added to the inner polymer composition 2208, as in the case of the PCT derivatives, ThermxA or PCTA™, to reduce the melting temperature.

As will be appreciated, strength, elasticity, and dye-ability can be impacted by the degree to which the fibers are drawn. Additionally, the fibers can be singed, calendared, or embossed.

The preferred inner and outer polymer compositions 2204 comprise at least about 25 wt. % PCT, more preferably at least about 50 wt. % PCT, and even more preferably at least about 75 wt. % PCT. The composition may include other desirable additives, typically at least about 0.1 wt % and more typically from about 0.5 to about 25 wt % plasticizer(s). Suitable plasticizers are known to those skilled in the art.

The superior properties of PCT are also amenable to flock coloration using sublimation dyes and, therefore, make PCT a desirable sheath component. As will be appreciated, flock can be colored by sublimation dyes by many techniques. In such coloration techniques, the flocking material is a white flock and a sublimation dye is added to the white flock by suitable techniques after flock application to the underlying (or overlying) adjacent adhesive layer. In these various techniques, the sublimation dye is heated until the dye enters the vapor phase (by direct conversion of the solid phase to the vapor phase). The fibers are also heated to about the same temperature as the vaporized dye. The fiber accepts the vaporized dye, which colors the fibers. During dye application and subsequent curing under, heat (temperatures typically of at least about 340° F. and more typically ranging from about 350° F. to about 400° F.) and pressure (typically of at least about 2 psi and more typically ranging from about 12 to about 50 psi) is/are applied to the flock and tends to flatten or deform flock fibers. In comparison to PET, PCT, nylon, or rayon as the core component, due to their higher melt points and greater loft and loft retention, will not flatten as much as PET, if at all. Nylon and rayon fibers as the sheath component, however, will not accept sublimation dyes as well as PET or PCT.

The flock can be applied by electrostatic, gravity, and vibrating techniques directly to a substrate or to a carrier for indirect application to the substrate. For example and as discussed below, the PCT-containing or bicomponent fibers discussed above can be used as the flock material in the processes/articles in any of U.S. Pat. Nos.: 4,810,549; 5,047,103; 5,207,851; 5,346,746; 5,597,637; 5,858,156; 6,010,764; 6,083,332; 6,110,560; U.S. patent applications Ser. Nos.: 09/735,721 filed Dec. 13, 2000; 09/621,830 filed Jul. 24, 2000; 29/058,551 filed Aug. 19, 1996; 09/548,839 filed Apr. 13, 2000; 09/973,113 filed Oct. 9, 2001; and U.S. Provisional Applications Ser. Nos. 60/327,642, filed Oct. 5, 2001, 60/344, 862, filed Nov. 8, 2001, and 60/332,647, filed Nov. 21, 2001, each of which is incorporated herein by this reference.

The Process and Article of the First Configuration

Figure 1:
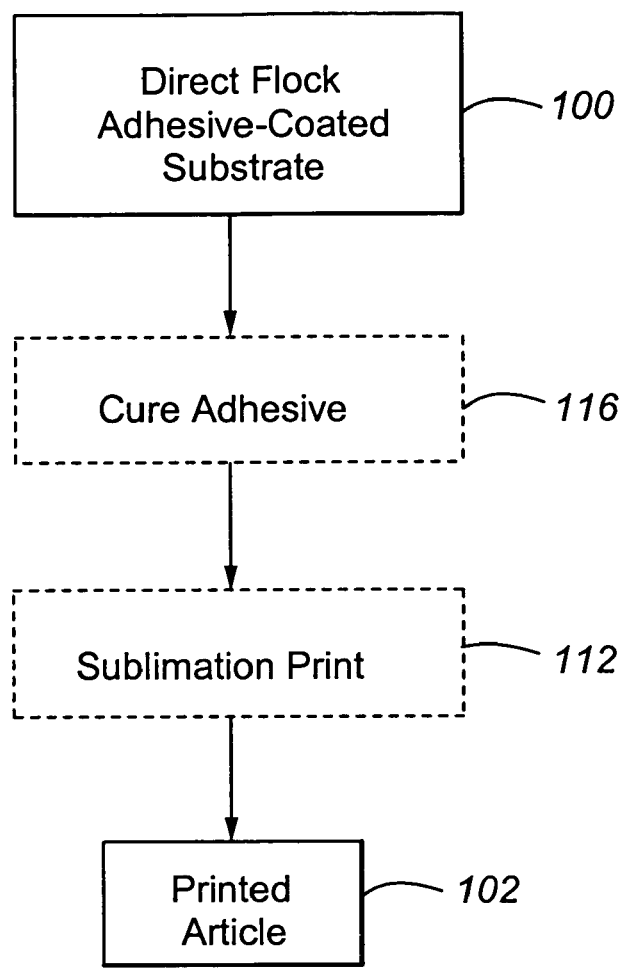
FIG. 1 is a first process embodiment according to the present invention.
Figure 2:
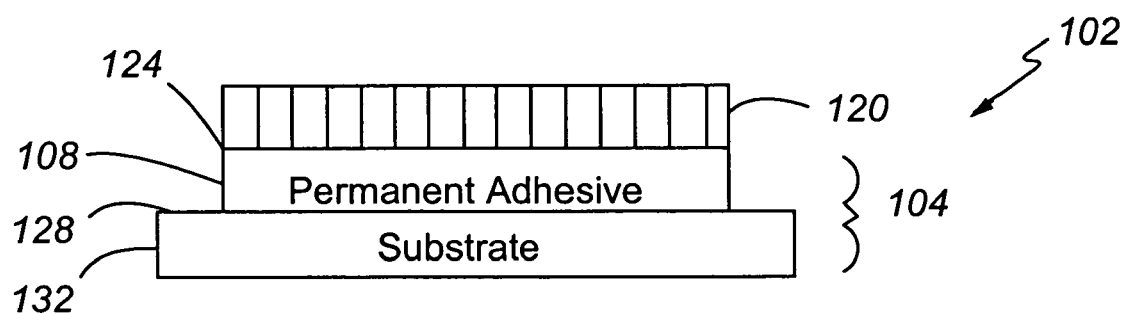
FIG. 2 is a first flocked article embodiment made by the process of FIG. 1.

Referring to FIGS. 1 and 2, the process and article of the first embodiment of the present invention will now be described. This process is further discussed in U.S. Provisional Application Ser. Nos. 60/366,580 filed Mar. 21, 2002; 60/393,362, filed Jul. 3, 2002; and 60/416,098 filed Oct. 4, 2002, each of which is incorporated herein by reference.

In the first step 100, an adhesive-coated substrate 104 is direct flocked by known techniques using the flock of the present invention. The flock is typically white in color and can be flocked by any suitable technique, with electrostatic flocking being preferred. The adhesive may be applied discontinuously to the substrate in a desired (direct) image.

The adhesive used in adhesive layer 108 may be any suitable permanent adhesive (as opposed to a release adhesive) that is thermally compatible with the sublimation printing temperature used in step 112. "Thermal compatibility" depends on the process configuration. When the adhesive is cured (e.g., fully activated, set, cross-linked, fused, otherwise fully bonded) 116 before sublimation printing in step 112, thermal compatibility is deemed to exist when the adhesive bond will not be detrimentally impacted by the sublimation printing temperature, such as by softening, tackifying, melting, or melting down the fibers. When the adhesive is cured during or simultaneously with sublimation printing, thermal compatibility is deemed to exist when the temperature required to fully activate, set, cross-link, fuse, or otherwise fully bond the adhesive is at or below the sublimation printing temperature. When the adhesive is cured after sublimation printing, thermal compatibility is deemed to exist when the temperature required to fully activate, set, cross-link, fuse, or otherwise fully bond the adhesive is above the sublimation printing temperature.

Preferred adhesives can be any suitable adhesive, with water-and solvent-based adhesives being preferred. Particularly preferred adhesives include hot melt thermoplastic and thermoset adhesives. As will be appreciated, thermoset adhesives solidify or set irreversibly when heated above a certain temperature. This property is usually associated with a cross-linking reaction of the molecular constituents induced by heat or radiation. Thermoset adhesives can include curing agents such as organic peroxides, isocyanates, or sulfur. Examples of thermosetting adhesives include polyethylene, phenolics, alkyds, amino resins, polyesters, epoxides, polyurethanes, polyamides, and silicones.

Following curing of the adhesive layer 108 in step 116 (or 112), which is typically performed using radiation (e.g., heat or light) the flocked surface can be vacuumed to remove loose flock fibers. This removal of loose flock fibers can improve the quality of the image in the later sublimation printing step.

In sublimation printing step 112, the flocked surface 120 is sublimation printed by any suitable technique to provide multi-colored flock in a desired design. As will be appreciated, common ways of performing sublimation printing include inkjet sublimation printing and heat transfer sublimation printing using devices such as an inkjet dye sub printer, a ribbon-based dye sub printer, a hybrid sublimation printer, and a small dye sub ribbon-based printer.

In inkjet (direct) sublimation printing, a special heat sensitive dye is used in a computer-controlled printer, such as an HP 550™, or Mimaki JV4™ to sublimation print the dye onto the flock fibers through vapor phase transportation of the dye from the printer to the flock fibers. The transferred dye is then heat and pressure cured.

In heat transfer sublimation printing, special heat sensitive dye is deposited on a carrier paper or film The paper or transfer is used by a suitable technique, such as offset printing, screen printing, rotograviere printing, heliographic or flexographic printing or serigraphic printing by flat plate or rotary plate to deposit dye onto a carrier. Transferring is done by placing the transfer in contact, under regulated pressure and at a predetermined temperature, generally with the aid of hot rolls, with the flocked surface, generally for a duration of about 5 to about 40 seconds. The hot rolls can comprise, in the case of printing in formats, a hot press with horizontal plates, or in the case of continuous printing from rolls of printed paper and of synthetic material to be printed, a rotating heated cylinder associated with a belt rolling under tension.

Surprisingly and unexpectedly, flock fibers 120 of the present invention, after experiencing the pressures and temperatures of sublimation printing, maintain their printing orientations. This loft retention can be facilitated by vacuuming the dyed flock fibers after rather than before sublimation printing. The retained orientation of at least most of the flock fibers is, as shown in FIG. 2, at least substantially perpendicular to the planar surface 124 of the adhesive layer 108 and surface 128 of the substrate 132.

The substrate 132 can be any substrate that is dimensionally stable under the conditions of temperature and pressure encountered during sublimation printing and adhesive curing. An example of a preferred substrates is a formable thermoplastic material, such as a polycarbonate. In in-mold applications, the dimensionally stable substrate or backing film preferably has a melting point that is at or above the maximum temperature experienced in the closed mold (or the maximum temperature of the resin) and tensile and compressive strengths and thermal stability sufficient to withstand the maximum pressures experienced in the closed mold without warping or shrinking. As will be appreciated, it is important that the resin 6 be chemically and physically (e.g., thermally) compatible with the substrate 104 to produce a strong melt bond between materials and thus an integral article after removal from the closed mold. Preferably, the substrate or backing film is a thermoplastic polymeric material and the polymers in the substrate 104 cross-link with the polymers in the resin 6. Exemplary backing films include monomers or polymers of styrene, acrylics, vinyls, olefins, amides, cellulosics, carbonates, esters, and mixtures thereof A particularly preferred substrate for many resins is a polycarbonate. Thus, the film is able to withstand high pressure and high temperature without degrading, cracking, or melting. The film can be later formed into a desired shape for insertion into the mold.

The product of the process is printed article 102.

The Process and Article of the Second Configuration

Figure 3:
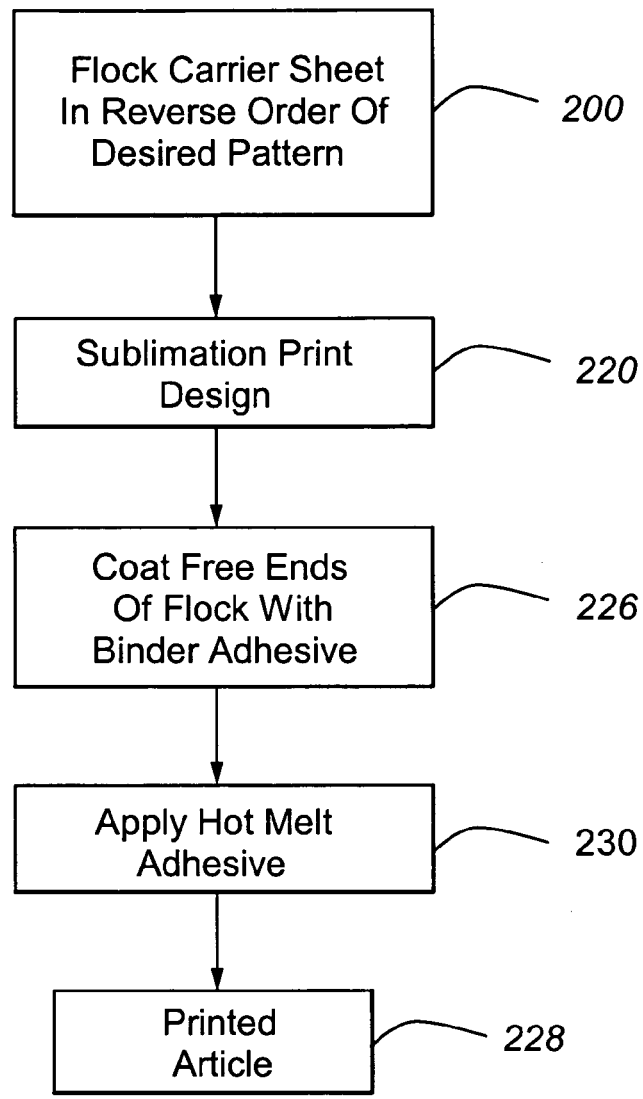
FIG. 3 is a second process embodiment according to the present invention.
Figure 4:
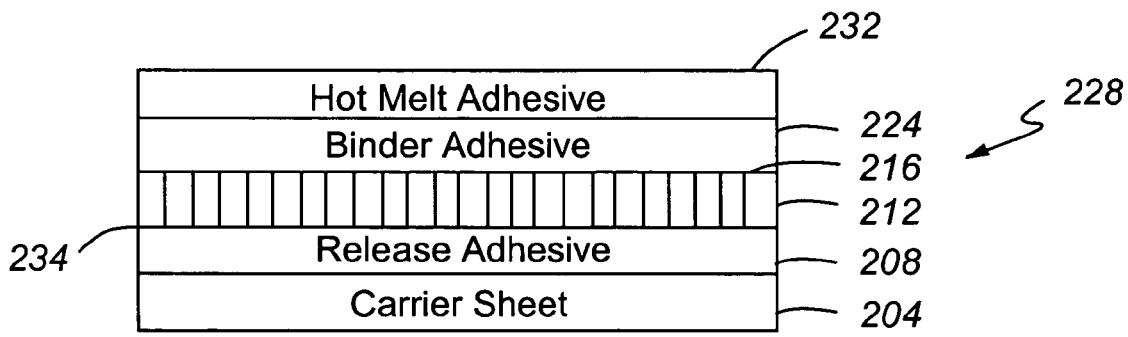
FIG. 4 is a second flocked article embodiment made by the process of FIG. 3.

Referring to FIGS. 3 and 4, the process and article of the second embodiment of the present invention will now be described. This process is further discussed in U.S. Pat. Nos. 4,810,549; 5,207,851; 5,597,637; 5,858,156; 6,010,764; 6,083,332; and 6,110,560, each of which is incorporated herein by this reference.

In step 200, the carrier sheet 204 containing a temporary release adhesive 208 (such as wax) in the reverse of the desired pattern or image is flocked by suitable techniques, preferably electrostatically, with the flock of the present invention.

The carrier sheet 204 can be any suitable transfer carrier, such as dimensionally stable paper, processed paper, plastic film, resin sheets, and metal foils. Depending on the desired effect and the sheet materials employed, the carrier can be transparent, translucent, or opaque, but is typically transparent. Typically (but not always), the primary carrier is a discontinuous sheet as opposed to a continuous sheet on a running web line.

The release adhesive 208 can be any adhesive that has a relatively low bonding strength with the resin film (as is commonly known for stickers or pressure-sensitive decal media). The release adhesive may be applied in the form of a solution or emulsion, such as a resin or a copolymer, e.g., a polyvinyl acetate, polyvinyl alcohol, polyvinyl chloride, polyvinyl butyral, acrylic resin, polyurethane, polyester, polyamides, cellulose derivatives, rubber derivatives, starch, casein, dextrin, gum arabic, carboxymethyl cellulose, rosin, or compositions containing two or more of these ingredients. Preferably, the release adhesive has a sufficiently low surface energy to enable even coating of the resin dispersion (applied in the next step) on the release adhesive.

The release adhesive 208 may be applied on the carrier in the perimeter shape of the desired design or without regard to the overall design desired. The release adhesive may be applied by any suitable technique such as, for example, by applying the release adhesive with rollers or spraying the release adhesive.

The exposed ends 216 of the flocked surface 212 are then sublimation printed in step 220 by the techniques discussed previously. As a part of the sublimation printing step 112, the flock is subjected to heat and pressure to fix the transferred sub-dye dyes. As noted, vacuuming of the flock can be conducted before or after sublimation printing.

The exposed, printed ends 216 of the flocked surface are next contacted in step 226 with a binder adhesive 224, such as a water-based acrylic which binds the flock together as a unit. The binder 224 adhesive may contain a hot melt adhesive for binding the printed article 228 to a desired substrate.

In optional step 230, the hot melt adhesive 232 is applied to the previously applied binder adhesive 216. After bonding of the hot melt adhesive 232 to a desired substrate, the carrier sheet 204 can be removed to permit the dye on the now exposed surface 234 to be visible.

The Process and Article of the Third Configuration

Figure 5:
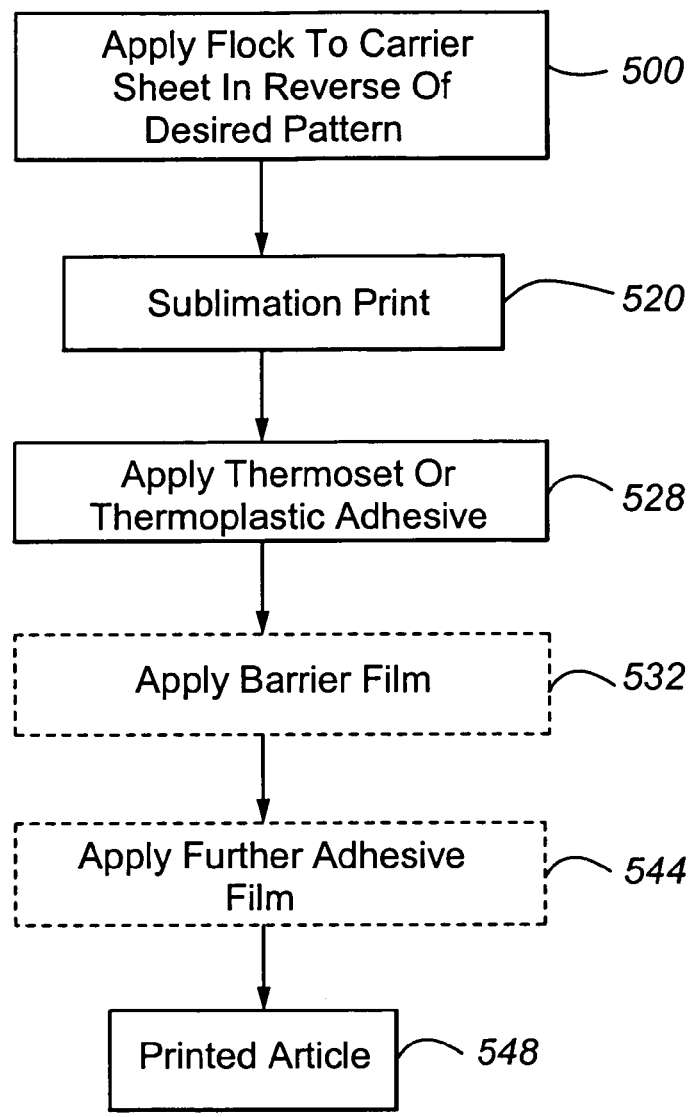
FIG. 5 is a third process embodiment according to the present invention.
Figure 6:
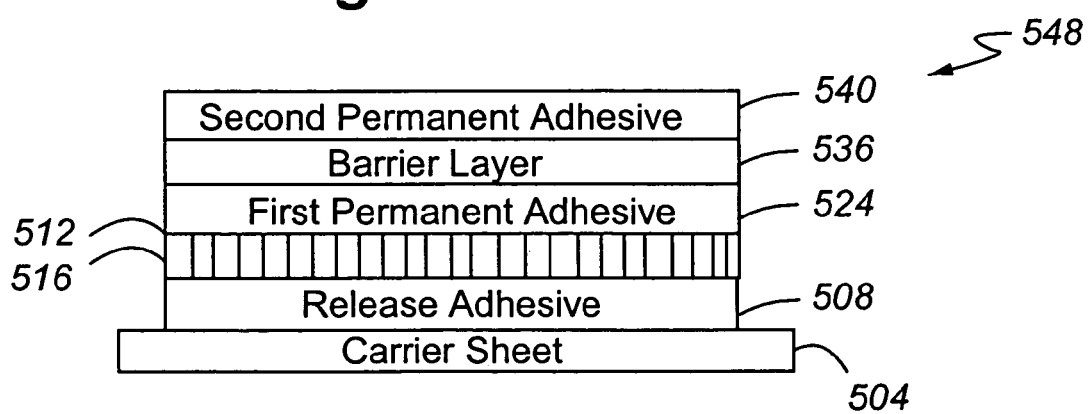
FIG. 6 is a third flocked article embodiment made by the process of FIG. 5.

Referring to FIGS. 5 and 6, the process and article of the third embodiment of the present invention will now be described. This process is further discussed in U.S. patent Ser. Nos. 09/548,839; 09/35,721; and 09/621,830, each of which is incorporated herein by this reference. PCT-containing and bicomponent fibers are ideal fibers to withstand the temperature and pressure used in the lamination process in this configuration.

In step 500, the carrier sheet 504 containing a temporary release adhesive 508 (such as wax) in the reverse of the desired pattern or image is flocked by suitable techniques, preferably electrostatically, with the flock of the present invention.

The exposed ends 512 of the flocked surface 516 are then sublimation printed in step 520 by the techniques discussed previously. As noted, vacuuming of the flock can be conducted before or after sublimation printing.

The exposed, printed ends 512 of the flocked surface are next contacted with a first permanent adhesive 524 in step 528. The permanent adhesive is preferably an activatable hot melt adhesive such as a thermoset or thermoplastic adhesive.

In step 532, the first permanent adhesive 524 is contacted with an optional barrier film 536.

The barrier film 536 can perform a number of differing purposes. For example, the barrier film can be selected to provide a desired coloration to the transfer, e.g., opacity, when viewed by a customer. The barrier film 536 could also be used to provide a desired color in areas where flock is intentionally omitted. This can produce a 3-D appearance to the viewer. Examples of film compositions for this objective include decorative media such as a textile, glitter, reflective glass, beads and etc. The film 536 can be selected to provide desired physical properties to the transfer. For example, the film 536 can have high tensile and compressive strengths and a low modulus of elasticity to provide rigidity or a high modulus of elasticity to provide elasticity. This type of barrier film is discussed in U.S. Provisional Application Ser. Nos. 60/403,992 and 60/405,473. Examples of film compositions for this objective include rubber and polyurethane. The film 536 can act as a barrier film to migration of the second permanent adhesive 540 into the flock 516.

In step 544, the second permanent adhesive 540 is optionally applied to the barrier layer 536 to permanently bond the printed article 548 to a desired substrate. The second permanent adhesive can be any of the adhesives noted above, with activatable adhesives being preferred. In one configuration, the second permanent adhesive is a preformed film, such as a polycarbonate film.

As will be appreciated, step 520 can be performed after steps 528, 532, and/or 544 (any one or a multiple of which can be performed separately or simultaneously by laminating techniques) and subsequent removal of the carrier sheet to provide a surface for printing.

As will be further appreciated, during thermal activation of the hot melt adhesive setting of the dye applied by sublimation printing step 520 (using inkjet techniques) can be performed when sublimation printing is done after steps 528, 532, and 544. This eliminates a separate process step to set the adhesive.

The Process and Article of the Fourth Configuration

Figure 7:
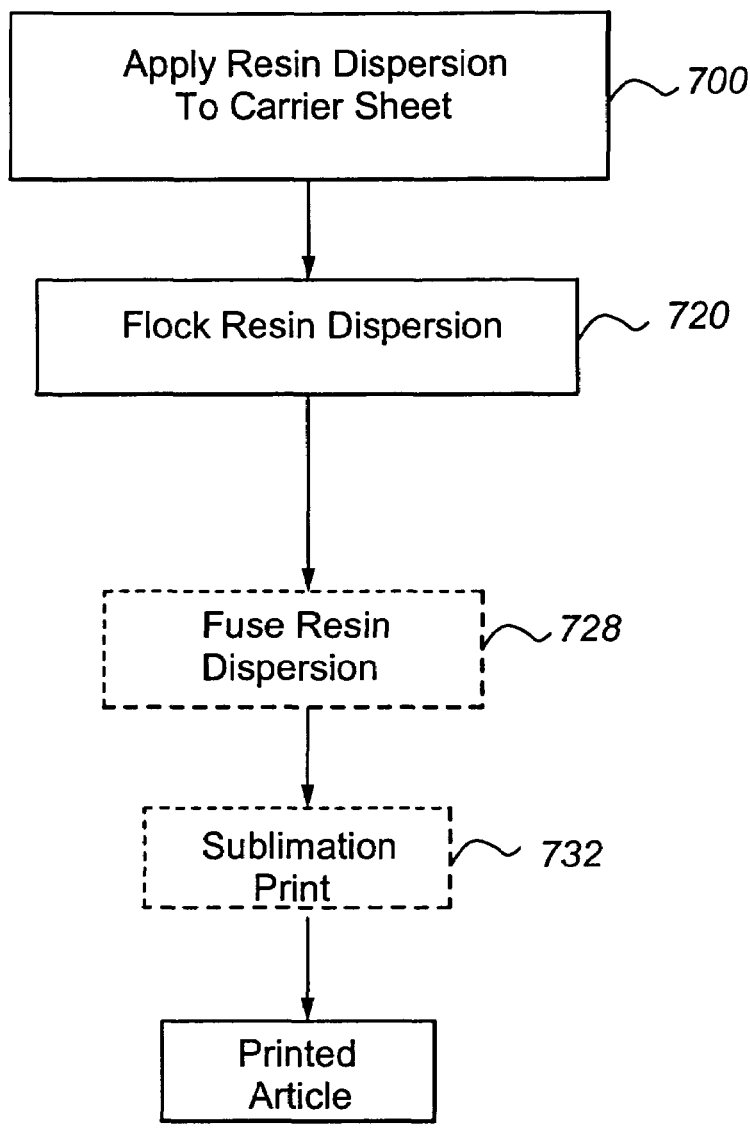
FIG. 7 is a fourth process embodiment according to the present invention.
Figure 8:
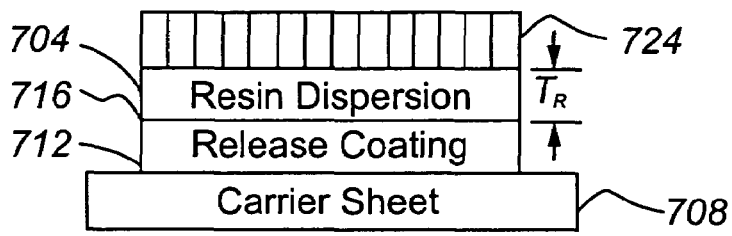
FIG. 8 is a fourth flocked article embodiment made by the process of FIG. 7

Referring to FIGS. 7 and 8, the process and article of the third embodiment of the present invention will now be described. This process is further discussed in U.S. Provisional Application Ser. No. 60/327,642, filed Oct. 5, 2001, entitled "Screen Printed Resin Film Applique Made from Liquid Plastic Dispersion", to Abrams, Ser. No. 60/344,862, filed Nov. 8, 2001, of the same title, to Abrams, and Ser. No. 60/332,647, filed Nov. 21, 2001, of the same title, to Abrams, each of which is incorporated herein by this reference.

In step 700, the resin dispersion 704 is applied to the carrier sheet 708 and release adhesive 712 in the direct image of the desired pattern.

The (liquid, semi-liquid, or semi-solid) resin dispersion 704 is applied, e.g., screen printed (through an image screen) using a screen printer, onto the upper surface 716 of the release coating 712 on the carrier 708 using known techniques. The resin dispersion 704 is typically applied in the perimeter shape of the desired shape or design to avoid cutting or trimming of the resin dispersion in later stages of the manufacturing process. Alternatively, the resin dispersion can be deposited on the carrier 708 by other techniques, such as spraying, extruding, and/or application through an image screen or template, that place the resin dispersion into distinct (discontinuous) image areas (as opposed to an overall (continuous) coating) onto the primary carrier.

The resin dispersion 704 can be any resin dispersion that will produce a resin film after fusing having desired characteristics. Considerations in formulating resin dispersions include screen printability, desired softness, desired thickness, color or other special effects (inclusion of glitter particles for example), acceptability and permanent adhesion of flock fibers, wash fastness, tensile strength, ability to be formed, welded and cut with a metal die in the high frequency field, and satisfactory adhesion when welded onto a desired substrate. To provide a high tensile strength, the resin dispersion typically includes at least about 0.1 wt. %, more typically at least about 0.5 wt. %, and even more typically from about 0.5 to about 2.5 wt. % of a curing agent.

Because the resin film (after the fused stage) is preferably self-supporting after removal from the primary carrier and able to withstand handling by customers, production personnel, washing/wearing, and/or machinery, the resin film (after fused stage) typically requires a minimum tensile strength. The resin dispersion should be able to form a resin film that is reactive to high frequency welding. As will be appreciated, the gelled and fused resin dispersion or resin film could be applied to a substrate by sewing, stitching or other mechanical application. Typically, the resin film will have a tensile strength similar to that of commonly available calendared, cast, and/or extruded films and greater than tensile strength of PLASTISOL™ transfer dye films. Preferably, the tensile strength of the resin film is at least about 500 psi and more preferably ranges from about 600 to about 1,000 psi. To realize this tensile strength, the thickness $T_R$ of the resin dispersion 16 (when applied) preferably is at least about 6 mil, more preferably ranges from about 8 to about 25 mil, and even more preferably from about 8 to about 12 mil, and the thickness of the (gelled and fused) resin film preferably is at least about 2.5 mil, more preferably at least about 4 mil, and even more preferably ranges from about 5 to about 20 mil.

The resin dispersion should also have a sufficient density (or average molecular weight) to be (highly) reactive to high frequency welding. Preferably, the viscosity of the resin dispersion ranges from about 20,000 to about 5,000,000 cp at 25° C.

Preferred resins in suitable resin dispersions include vinyls, such as plastisol (which comprises a polyvinyl chloride resin), urethanes, nylons, acrylics, acetates, and/or olefins. "Vinyls" refer to a compound including the vinyl grouping ($CH_2$—CH—) or a derivative thereof, "urethanes" to a compound including the grouping $CO(NH_2)OC_2H_5$ or a derivative thereof, nylons to a compound having the grouping —CONH or a derivative thereof; acrylics to a compound including the acrylonitrile grouping or a derivative thereof; acetates to an ester of acetic acid where the substitution is by a radical; olefins to a class of unsaturated aliphatic hydrocarbons having one or more double bonds; amides to a class of compounds comprising an acyl group (—$CONH_2$) typically attached to an organic group "R", where R can include hydrogen, an alkyl group, and an aryl group. More preferably, at least most of the resin is a vinyl polymer or oligomer, a urethane polymer or oligomer, an acetate polymer or oligomer, an amide polymer or oligomer, and mixtures thereof. Even more preferably, the resin is a poly (vinyl chloride), a polyurethane, a poly (ethylene vinyl acetate), a polyamide, and mixtures thereof As noted, the resins in the resin dispersion typically include polymers and/or oligomers of the foregoing compounds. Preferably, the resin dispersion comprises at least about 25 wt. %, more preferably at least about 26 wt. %, and even more preferably from about 25 to about 35 wt. % of the resin. The remainder of the resin dispersion is primarily composed of the plasticizer (which typically is from about 30 to about 40 wt. % of the resin dispersion). Typically, the resin dispersion includes no more than about 45 wt. % of the other additives noted above. A preferred resin dispersion is Rutland Screen Printing Plastisol™ manufactured by Rutland Plastic Technologies, Inc.

When the resin dispersion includes polyvinyl chloride as the resin component, the resin dispersion can be prepared by hot mixing the resin with plasticizers and, typically small proportions of, stabilizers to provide a resin film that is flexible and pliable. Pigment(s) can be included to provide resin films in a wide range of colors, as well as crystal clear. As will be appreciated, a flexible and pliable resin film is preferred over a rigid resin film as a flexible and pliable film conforms readily to undulations in the surface of the substrate to which the resin film is later applied, such as using dielectric (capacitance) welding or high frequency (HF) welding (e.g., plain welding or tear-seal welding).

In step 720, flock 724 is applied to the resin dispersion 704.

In optional step 728, the resin dispersion 704 is heated or cured, such as in an infrared dryer, to a temperature at or above the gel temperature and the fused stage temperature of the resin dispersion for a time sufficient for the resin dispersion to pass through both the gel stage (in which the resin dispersion partially solidifies or begins to solidify) and fusing stage (in which the resin dispersion fully solidifies) and form a fused resin film.

As will be appreciated, the gel temperature or gel point is the temperature at which the resin dispersion starts to become a solid. The gel point of a resin dispersion determines how fast the resin dispersion will flash (or the liquid component(s) vaporize) at a given thickness. A thinner film will flash more quickly than a thicker film as there is less material to dry.

The fused stage temperature of a resin dispersion is that temperature necessary to completely fuse, at least substantially, the resin dispersion. This temperature is typically dictated by the resins and plasticizers in the formulation and is typically (320)(dwell or residence time)° F./160° C. Typically, the heating temperature is at least about 340° F. and more typically ranges from about 320° F. to about 370° F. The residence time is typically at least about 0.5 minute and more typically ranges from about 1 to about 3 minutes.

As desired, the flocked surface can be vacuum cleaned to remove residual flock.

In step 732, the flocked surface 724 is sublimation printed to impart a desired image on the flocked surface 724. alternatively, the flock fibers are precolored before contact with the resin dispersion.

As will be appreciated, the vacuuming step can be performed after sublimation printing as desired.

As will be further appreciated, the curing of the resin dispersion can be performed during or after sublimation printing, depending on the temperatures used in the sublimation printing step.

The fused resin film, after fused stage or solidification, or printed article is peeled from the primary carrier 708 to form a free form image.

The Process and Article of the Fifth Configuration

Figure 9:
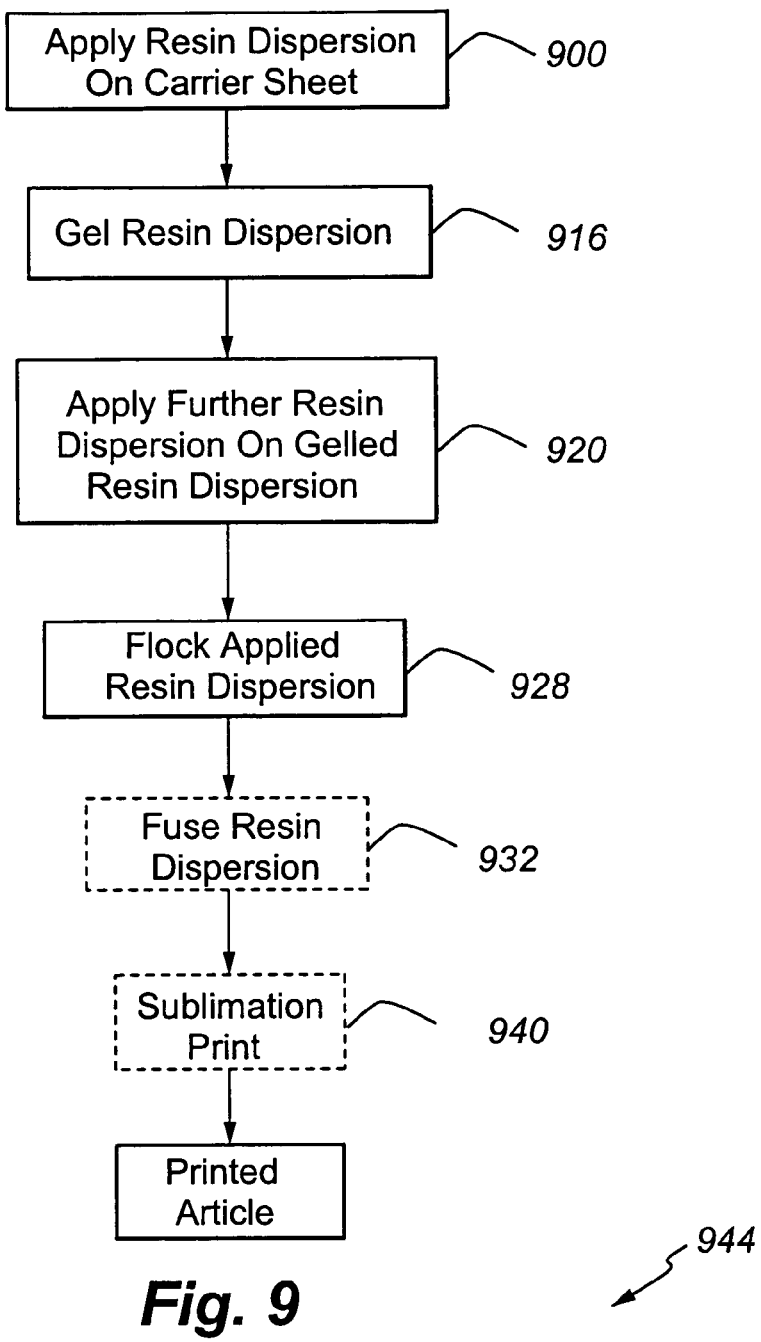
FIG. 9 is a fifth process embodiment according to the present invention.
Figure 10:
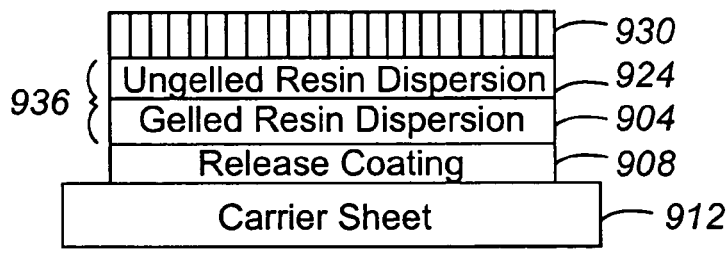
FIG. 10 is a fifth flocked article embodiment made by the process of FIG. 9.

Referring to FIGS. 9 and 10, the process and article of the third embodiment of the present invention will now be described.

In step 900, a resin dispersion 904 is applied (e.g., screen printed) onto the release coating 908 on carrier sheet 912 in a desired pattern or shape or design.

In step 916, the resin dispersion 904 is heated to a sufficient temperature (at or above the gel temperature and below the fused stage temperature) and held at the temperature for a sufficient time to gel (but not fuse) the resin dispersion.

In step 920, a further resin dispersion layer 924 is screen printed onto the gelled resin dispersion layer 904, typically in the same pattern as the gelled resin dispersion layer 904.

In step 928, flock 930 is applied by suitable techniques to the (ungelled) resin dispersion layer. The transfer has the configuration of FIG. 10, after the step.

In optional step 932, the resin dispersion layers 924 and 928 are both heated to a sufficient temperature (above the fused stage temperature) and held at the temperature for a sufficient time to fuse the two layers. The fused stage will occur not only within each layer but also between the layers to form a composite layer 936 having a sufficient tensile strength to be removed from the primary carrier and resist normal tensile forces experienced during handling. This process is desirable, such as flocking, where the flock can penetrate through a single (ungelled) resin dispersion layer. The gelled layer 904 acts as a "backstop" and prevents the flock from passing completely through the ungelled resin dispersion 924, which can weaken the tensile strength of the gelled film.

In step 940, the flocked surface 930 is sublimation printed to impart a desired image on the flocked surface 930.

As will be appreciated, the vacuuming step can be performed after sublimation printing as desired.

As will be further appreciated, the curing of the resin dispersion can be performed during or after sublimation printing, depending on the temperatures used in the sublimation printing step.

The printed article 944, after fused stage or solidification, is peeled from the primary carrier 912.

The Process and Article of the Sixth Configuration

Figure 11:
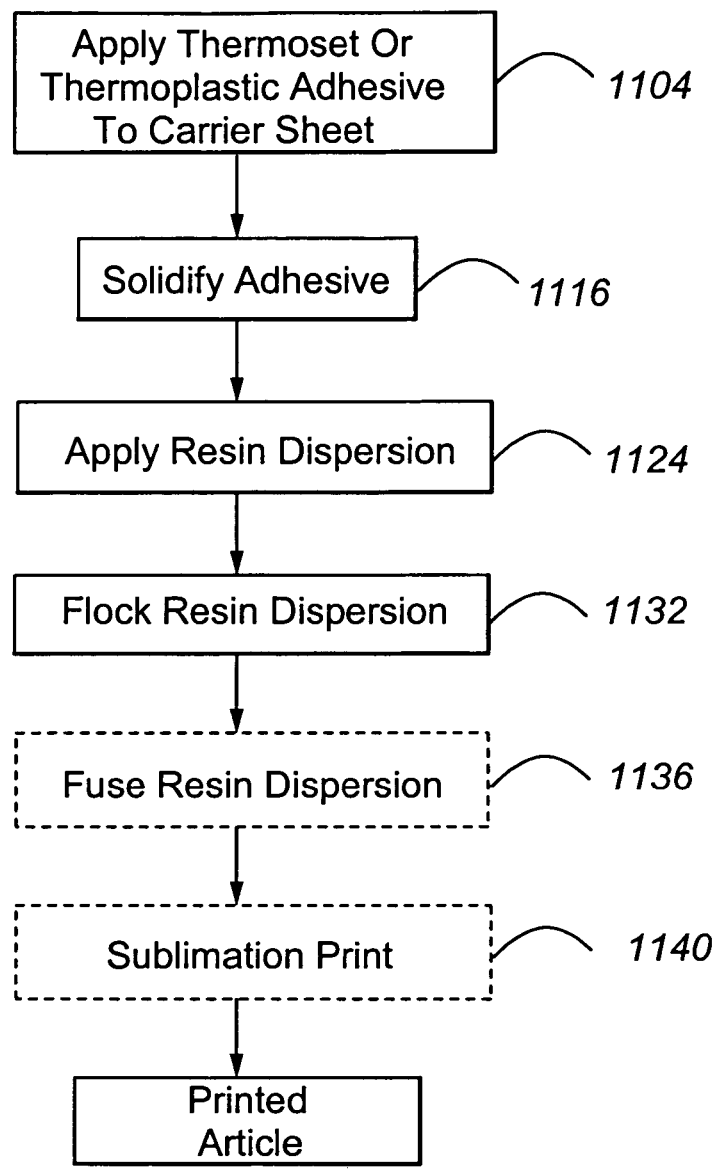
FIG. 11 is a sixth process embodiment according to the present invention.
Figure 12:
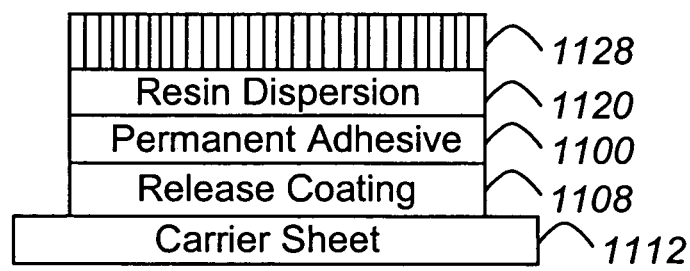
FIG. 12 is a sixth flocked article embodiment made by the process of FIG. 11.

Referring to FIGS. 11 and 12, the process and article of the sixth embodiment of the present invention will now be described.

In step 1104, an activatable adhesive 1100 is screen printed in a desired shape or pattern onto the release coating 1108 on carrier sheet 1112. The activatable adhesive 1100 can be any adhesive that is activated by pressure, heat, or light. Preferred activatable adhesives include thermoplastic or thermoset resins, such as an emulsion or dispersion of polyurethane, polyvinyl chloride, polyvinyl acetate, polyester, polyamide, acrylic, nylon, paraffin, and rubber derivative. A preferred activatable adhesive is Vestamelt™ manufactured by BGB Stockhausen Ag. As will be appreciated, the activatable adhesive 1100, or particles thereof, could preferably be suspended in a liquid dispersion or emulsion so as to make it coatable by screen printing or other methods onto the primary carrier.

In optional step 1116, the activatable adhesive 1100 is treated, typically by thermal techniques, to dry or cure or solidify the resin. Step 1116 may be omitted depending on the materials used.

The resin dispersion 1120 is applied in the desired shape/pattern over the adhesive 1100 in step 1124.

Typically, the activatable adhesive layer 1100 does not commingle with the resin film dispersion 1120. The two layers have differing functions and can interfere with one another if not kept separate (e.g., as two distinct layers). Separation can be achieved by a number of techniques, such as first solidifying (without fully activating) the activatable adhesive layer and/or using materials of substantially differing molecular weights and/or melting points. For example, the melting point and average molecular weight of the activatable adhesive 1100 is typically lower than the melting point/molecular weight of the fused resin formed from the resin dispersion 1120.

The flock 1128 is next applied in step 1132, and in optional step 1136 the resin dispersion 1120 is heated until it passes through the gelling and fusing stages.

In step 1140, the flocked surface 1128 is sublimation printed to impart a desired image on the flocked surface 1128 and form the printed article. Alternatively, the flock may be pre-colored before being applied in step 1132.

As will be appreciated, the vacuuming step can be performed after sublimation printing as desired.

As will be further appreciated, the curing of the resin dispersion can be performed during or after sublimation printing, depending on the temperatures used in the sublimation printing step.

The fused resin film, after fused stage or solidification, is peeled from the carrier 1112.

The Process and Article of the Seventh Configuration

Figure 13:
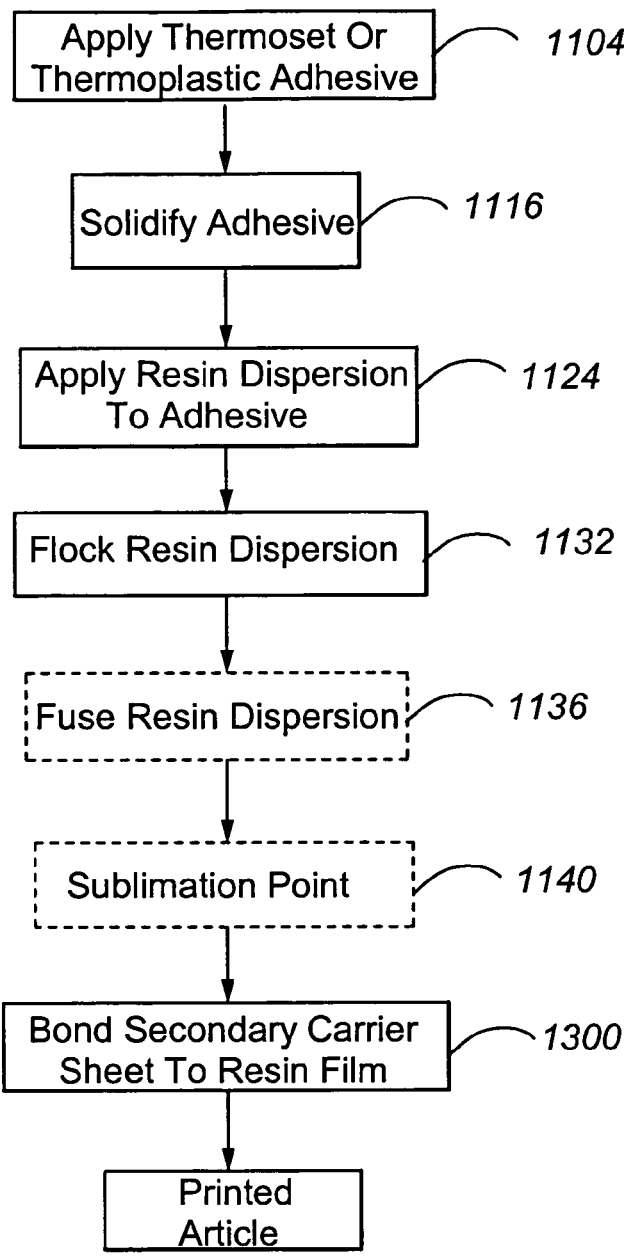
FIG. 13 is a seventh process embodiment according to the present invention.
Figure 14:
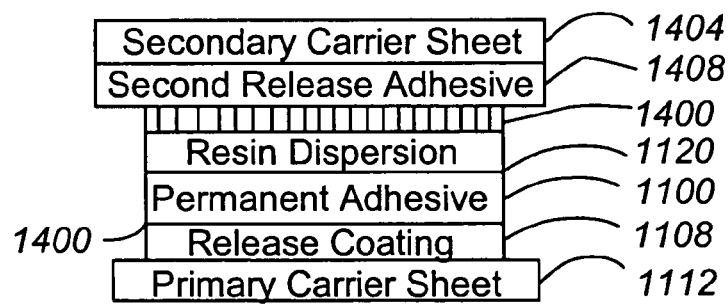
FIG. 14 is a seventh flocked article embodiment made by the process of FIG. 13.

Referring to FIGS. 13 and 14, the process and article of the seventh embodiment of the present invention will now be described.

In this embodiment, the flock 1400 (after application and, if performed, sublimation printing of the flock 1400 and before the fused stage) is bonded to a secondary carrier 1404 having a secondary release coating 1408 to facilitate later application of the permanent (activatable) adhesive 1100 to a substrate. The primary carrier 1112 and secondary carrier 1404 are located on opposing sides of the resin dispersion/resin film 1120 and flock 1400. The secondary carrier 1404 is bonded by any suitable technique, such as heat tacking or sealing, to the front face of the design.

The secondary release adhesive 1408 is selected such that the bond strength of the secondary release adhesive exceeds the bond strength of the release adhesive 1108. Thus, the bonding force of the secondary carrier (or secondary release adhesive) to the flock 1400 is greater than the bonding force of the primary carrier (or release adhesive 1112) to the (gelled or fused) resin dispersion/resin film 1120. Accordingly, the primary carrier 1112 can be removed from the resin film 1120 without removing the resin film 1120 and flock 1400 or portions thereof from the secondary carrier 1404. The bond strength of the secondary release adhesive 1408, however, is less than that of the gelled and fused resin film 1120 and is weak enough so that the secondary carrier 1404 may be readily removed from the flock 1400 after the resin film 1120 is bonded or otherwise attached to a substrate (not shown). Thus, the bond strength of the secondary release adhesive 1408 is also less than the bond or attachment strength of the resin film 1120 to the substrate. The secondary adhesive 1408 can be activatable after application to the flock, such as by pressure, heat, and/or light. The secondary adhesive 1408 can be, for example, a thermoplastic adhesive, a pressure sensitive adhesive, latex, a thermoset adhesive, wax, and mixtures thereof. This secondary adhesive 1408 is activated thermally to bond temporarily the secondary carrier 1404 to the flock.

In step 1140, the flocked surface 1400, if not pre-colored, is sublimation printed to impart a desired image on the flocked surface 1400. The secondary carrier sheet and release adhesive are thereafter applied in step 1300 to form the printed article.

As will be appreciated, the vacuuming step can be performed after sublimation printing as desired.

As will be further appreciated, the curing of the resin dispersion can be performed during or after sublimation printing, depending on the temperatures used in the sublimation printing step.

This embodiment is particularly useful where the design has a number of discrete or disconnected parts or segments. For example, the phrase NIKE™ has four disconnected parts, namely the letters "N", "I", "K", and "E". The secondary carrier 1404 maintains the desired spacing and orientation of the various letters after the carrier sheet 1112 is removed from the resin film 1120. Thus, the surface 1400 to be bonded to the substrate may be exposed without misorientation/misalignment of the differing parts of the design.

A number of variations and modifications of the invention can be used. It would be possible to provide for some features of the invention without providing others.

For example in one alternative embodiment, other polymers, copolymers and polymer blends having one or more of the properties discussed above may be used as the sheath or core of the flock fiber in the present invention. Examples of other suitable polymers for the inner and/or outer composition(s) 2208 include poly(phenylere sulfide) or PPS, a liquid crystal polymer or LCP, a high temperature polyamide, copolymers include poly(ethylene terephthalate co-1,4-cyclohexylene dimethylene terephthalate), and blends include blends of PET and PCT.

In another alternative embodiment, sublimation printing is not performed but the dye is spun into the polymer, copolymer, or polymer blend by known techniques. In this event, flocking could be done by any of the multi-color flocking techniques referred to above.

In another embodiment, the polymer in the sheath and/or core can include other blend compatible components, such as glass fiber, to provide improved thermal and/or strength properties. Examples of such polymer blends include the Thermx PCT polyesters CG007, CG033, CGT33, CG 053, CG907, CG923, CG933, and CG943 by Eastman Chemical Company.

In yet another embodiment, sublimation dyes are on the carrier sheet itself. In this embodiment, the sublimation transfer design is printed onto the carrier (which is typically paper and not a plastic film) and the release adhesive is thereafter applied to the carrier over the printed dyes. Simultaneously upon heat transferring the flocked transfer, the sublimation dyes vaporize and recondense on the flock. The release adhesive is selected to vaporize or melt at the sublimation temperature to permit the dyes to be transferred from the sheet to the flock. This process is similar to the product sold under the name SUBLI-FLOCK™. The process is particularly useful with the second and third embodiments in which case the sublimation printing step would occur simultaneously with bonding of the hot melt adhesive 232 or first or second adhesive as appropriate, to a desired substrate.

Sublimation Printed Articles for Molding

Figure 16:
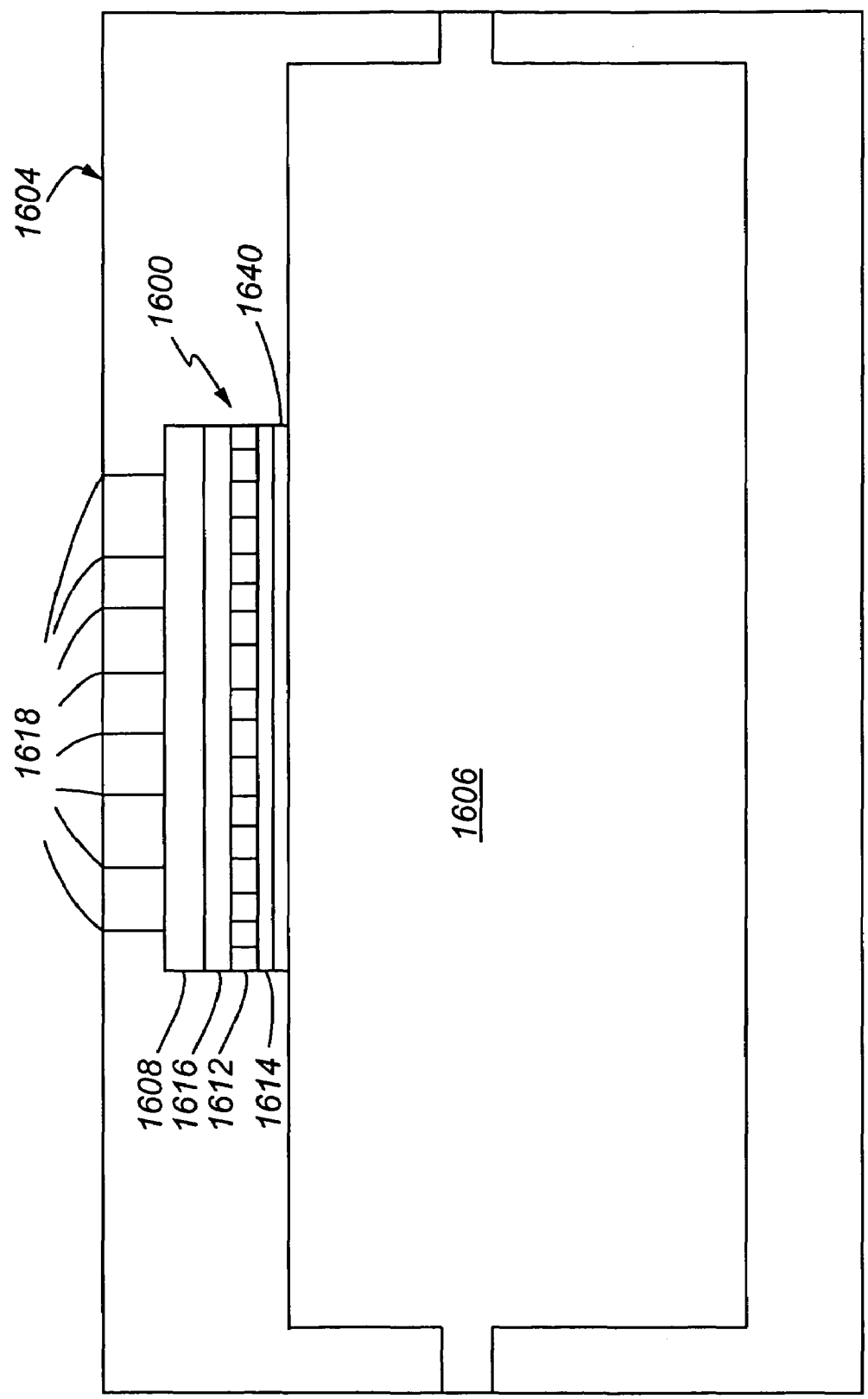
FIG. 16 is a side cross-sectional view of a first configuration of a die accommodating a mold insert.

Referring to FIG. 16, a mold insert 1600 of the present invention is shown in place in a mold 4 to be co-molded with a plastic article 1606. In FIG. 16, the mold insert 1600 is shown on top of the article 1606. The mold insert 1600 can be any of the printed articles noted above. The printed article may be formed by suitable techniques into a three dimensional shape to match the interior of the mold.

FIG. 16 illustrates the application of the mold insert 1600 to a molded article 1606 during the molding process. The mold insert 1600 is positioned in the mold 1604 by any suitable method, such as by the use of a vacuum. Vacuum holes 1618 are shown in the mold 1604 which pass through the mold body. As seen, the mold insert 1600 is in contact with the vacuum holes 1618. A vacuum can be drawn through the holes 18 to hold the mold insert 100 in place. The mold insert needs to be held securely in the mold to maintain the mold insert in the desired location on the finished plastic part. If a slight depression (of about 1 mm) is built into the mold cavity to accommodate the mold insert, it will be flush with the molded plastic surface of the finished part. This is seen in FIG. 16. If there is no depression, the flock decoration will stand up on top of the plastic surface.

After the transfer is positioned in the mold, the mold is closed and resin is injected into the mold. After the resin is injected into the mold, the mold is cooled by circulating water around the exterior of the mold. As the resin 1606 cools, it solidifies and forms a permanent melt bond to the backing film 1640. When the part is cooled sufficiently the mold opens up and the part is ejected. Finally, the release sheet 1608 and release adhesive 1616 are peeled off the fibers 1612 to reveal a finished, flocked, surface on the newly molded part.

As will be appreciated, the solidified resin can be any biodegradable or non-biodegradable moldable material. Preferably, the resin is a condensation or addition polymer having thermoplastic behavior. More preferably, the resin is a high polymer of one or more of a fluorocarbon, hydroxy acid, carboxylic acid, ester, ketone, hydroxy carboxylic acid, tetrafluoroethylene, nylon, phenol, formaldehyde, amide, imide, aryl, ketone, cellulose, ethylene, styrene, urethane, carbonate, isocyanate, vinyl, vinyl chloride, olefin, acetate, propylene, methyl methacrylate, vinyl acetate, ethylene terephthalate, cyclohexylenedimethylene terephthalate, ethylene glycol, terephthalic acid, hexamethylene diamine, sebacic acid, and butylene terephthalate and copolymers, terpolymers, composites, and blends thereof or an amino resin, epoxy resin, acrylic resin, silicones, and acrylic butyl styrene (ABS) resin. The resin can be in the form of a solid, liquid, semi-solid, or semi-liquid when injected into the mold and typically polymerizes in the mold due to heat and/or chemical reaction. As will be appreciated, a thermoplastic is a high polymer that softens when exposed to heat and returns to its original condition when cooled to room temperature.

The sheet 1608 can be any suitable transfer carrier including those discussed above.

The release adhesive 1616 is selected such that the bonding force between the release adhesive 1616 and the flock 1612 is less than the bonding force between the adhesive 1614 and flock 1612 on the backing film 1640. In this manner, the sheet 1608 and release adhesive 1616 can be removed after lamination of the transfer without causing separation of the flock from the adhesive film 1614 and backing film 1640. Preferably, the melting point of the release adhesive 1616 is greater than the maximum temperature realized by the injected resin in the mold (and the melting point of the resin) and more preferably greater than the maximum temperature realized by the release adhesive 1616 during molding. The release adhesive can be any of the release adhesives noted above.

Adhesive 1614 can also be any suitable adhesive, with water-, UV-curable, and solvent-based adhesives being preferred. Preferably, adhesive 1614 has a melting point that is greater than the maximum temperature realized by the injected resin in the mold (and the melting point of the resin) and more preferably greater than the maximum temperature realized by adhesive 1614 during molding (which melting point may be less than the resin temperature for a cooled mold). Particularly preferred adhesives include hot melt thermoplastic and thermoset adhesives.

As noted above, the flock 1612 used in any of the processes discussed herein can be any electrostatically chargeable fiber, such as the fibers discussed above. Preferably, the flock core component has a melting and/or softening point that is greater than the temperatures experienced by the flock in the mold (which, conservatively, is no less than the maximum temperature of the resin during the molding process). The flock core component is also preferably resilient under the pressures experienced in the mold. Resilient flock, such as certain polyesters and nylon flock, may matt down during molding but, after ejection from the mold, self-restore to its original orientation relative to the backing film. In most applications, the orientation is at least substantially orthogonal (perpendicular) to the surface of the backing film. Finally, it is preferable that the flock have high abrasion resistance and color fastness. The flock fibers noted above are desirable due to their abrasion resistance and color fastness.

It has been discovered that certain polyesters, particularly PCT, and polymers such as nylon and rayon are highly attractive as the backbone polymer in the inner composition 2208. Many polyester fibers, such as polyethylene terephthalate, soften at molding temperatures/pressures and/or have poor loft retention, causing an unattractive article and unpleasant surface to the touch. PET in particular typically mats down during molding and must be brushed or otherwise restored to a plush state. PCT, nylon and rayon, on the other hand, have been found to be highly resilient and readily rebounds (or self-restores) from matting when removed from the mold.

In a particularly preferred configuration, the flock has as the primary polymer in the inner composition 2208 nylon and/or PCT and the sheath of the fiber has a dyeable polyester polymer, such as PET, that is sublimation printed by one of the processes above prior to molding. Sublimation printing is typically performed before forming of the mold insert into a three dimensional shape and before or after the backing film 1640 is adhered to the printed article.

The dimensionally stable substrate or backing film 1640 prevents dislodgment of the mold insert from the desired position in the mold and flock from the adhesive 1614 due to pressurized flow of the resin into the closed mold during resin injection. The backing film 1640 preferably is a formable thermoplastic material having a melting point that is at near the maximum temperature experienced by the backing film 1640 in the closed mold (which is typically less than the melting point and maximum temperature of the resin) to provide a melt bond and tensile and compressive strengths and thermal stability sufficient to withstand the maximum pressures experienced in the closed mold without warping or shrinking. The softening point of the backing film is typically slightly lower than the maximum temperature realized by the resin and backing film during molding. As will be appreciated, it is important that the resin 1606 be chemically and physically (e.g., thermally) compatible with the substrate 1640 to produce a strong melt bond between materials and thus an integral article after removal from the closed mold. Preferably, the substrate or backing film is a polymeric material and the polymers in the substrate 1640 melt bond with the polymers in the resin 1606. Exemplary backing films include monomers, oligomers, or polymers (which term includes copolymers, terpolymers, etc.) of styrene, acrylics, vinyls, olefins, cellulosics, carbonates, urethanes, amides, ethylenes, carbonates, propylenes, and esters, acrylic butyl styrene (ABS), and mixtures thereof. A particularly preferred substrate for many resins is a polycarbonate. Thus, the film is able to withstand high pressure and high temperature without degrading, cracking, or melting.

The backing film is preferably nonwoven and neither a textile nor a fabric. Preferably, the backing film is in the form of a cast or extruded continuous film. Woven textiles and fabrics can resist forming into a three-dimensional or nonplanar shape due to the weave of the material.

There are several processes to manufacture the mold insert for the mold.

Figure 17:
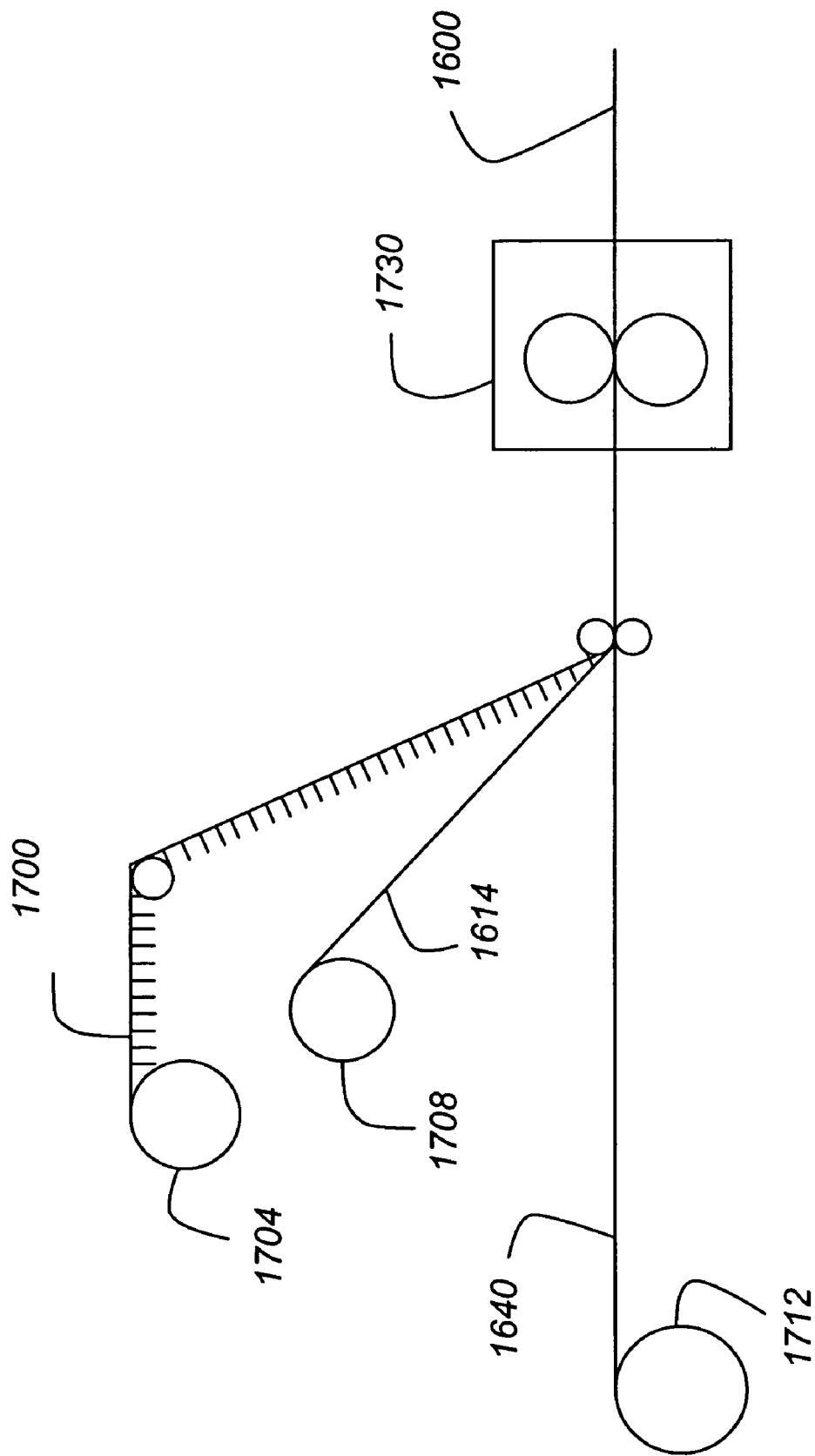
FIG. 17 is a side view of a continuous lamination process for forming a mold insert.

In one continuous process configuration shown in FIG. 17, a mold insert film 1600 is formed by first depositing the flock 1612 on the release adhesive 1616 which is located on the sheet 1608 and the flock then sublimation printed on the free ends of the flock, to form a flocked transfer sheet 1700. The flocked transfer sheet 1700 is positioned on a roll 1704. The release adhesive 1616 temporarily holds the flock in position on the sheet 1608. Additional rolls 1708 and 1712, respectively, are provided for the preformed permanent adhesive film 1614 and the preformed backing film 1640. Preferably, each of the adhesive film 1614 and backing film 1640 are calendered, extruded or coextruded films. The flocked transfer sheet 1700 is then contacted substantially simultaneously with the preformed) adhesive film 1614 and (preformed) backing film 1640 and laminated in a lamination machine 1730 by thermal techniques to form the mold insert film 1600. During lamination, the various layers are heated to a temperature sufficient to partially or fully activate (e.g., crosslink) the adhesive 1614. The mold insert film 1600 can then be cut into desired shapes before or after the mold insert film is preformed into the mold insert as discussed below. This process can be continuous using a running web line.

As will be appreciated, a (discontinuously distributed) adhesive 1614 can be positioned onto backing film 1640 only in desired areas. The product of this step is then laminated under the cut intermediate transfer (with the transfer (comprising the carrier, release adhesive, and flock and without the permanent adhesive), during lamination, being positioned above the adhesive/backing film assembly to form the mold insert.

The mold insert film 1600 of FIG. 16 can be formed into a 3D mold insert as set forth below. The mold insert can be cut to size for precise placement into the mold.

The dimensionally stable sheet 1608 may be removed from the mold insert film/mold insert after bonding to the substrate and before location of the mold insert in the mold or prior to forming of the mold insert.

When the mold insert is placed into the mold, the mold insert preferably fits precisely into corresponding extensions or recesses of the main mold cavity and the mold insert held in place during molding by suitable techniques such as pins, vacuum, etc.

After the mold insert is positioned in the mold, the mold is closed and molding conducted as set forth previously. After molding, the flock fibers typically stand proud of the exterior surface of the molded article.

The article of the present invention is superior to conventional molded articles using textiles. The differences between a flocked mold insert and a textile mold insert are substantial. A textile is typically (woven or knit) continuously constructed and has a plurality of connected, intermingled, and/or physically overlapped fibers in a multiplicity of transverse, crisscrossed orientations. The disorganized and transverse orientations of the fibers in the textile can have the appearance of a bird's nest. In contrast, a flocked mold insert, due to the precise electrostatic deposition of the fibers, typically has the fibers in parallel orientations perpendicular to the substrate. The fibers typically are at least substantially orthogonal to the planar surface of the backing film. The highly organized density of the fibers provides a plush feel and an attractive appearance. In a flocked mold insert, the fibers can also move independently of one another during the forming process or when being formed or dimensionalized.

Figure 18:
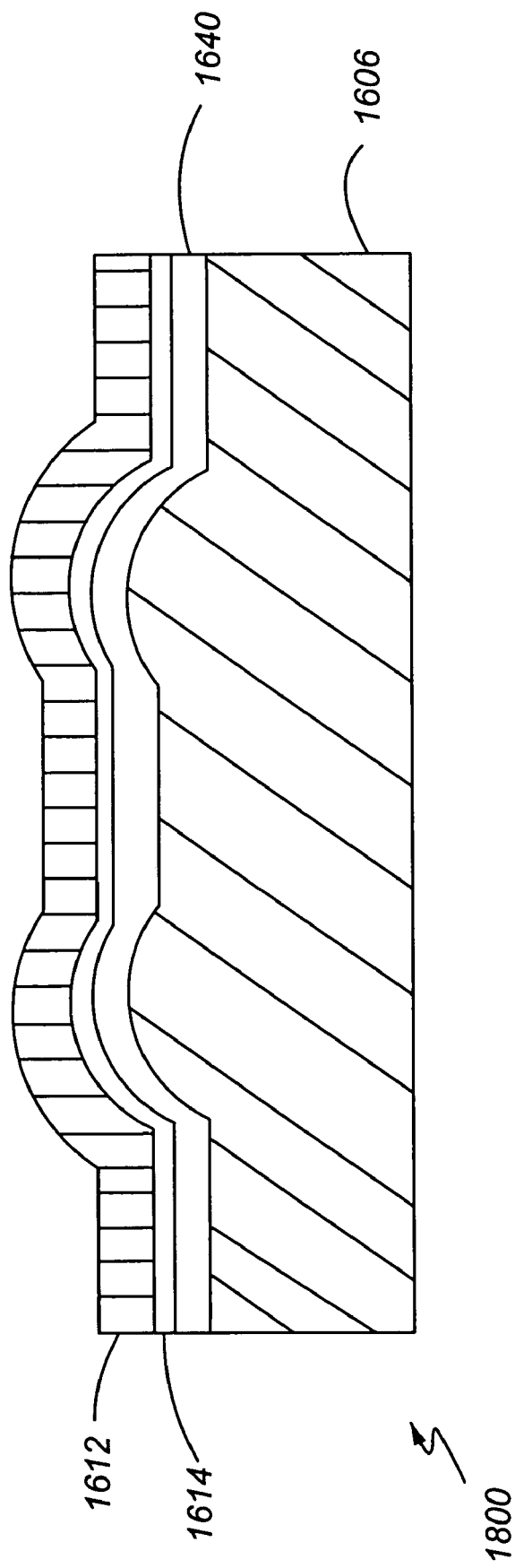
FIG. 18 is a side view of a molded article according to an embodiment of the present invention.

As shown in FIG. 18, the molded article 1800 after the mold is opened and the article removed therefrom comprises the film backing 1640, adhesive layer 1614, flock 1612 and solidified resin 1606.

Figure 19:
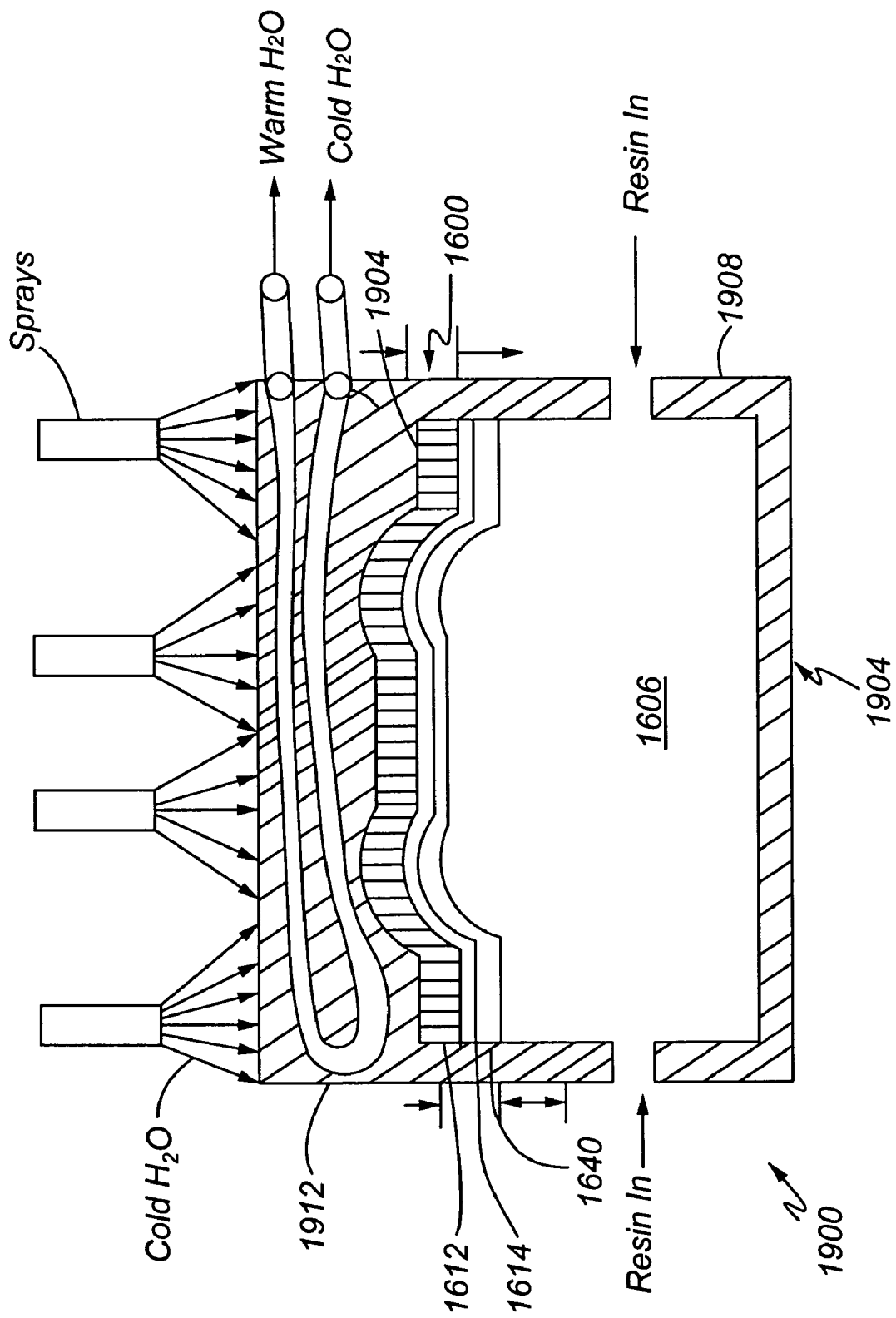
FIG. 19 is a side view of a second configuration of a die accommodating a mold insert.

As shown in FIG. 19, the flocked backing film can be formed into a three-dimensional shape or mold insert 1600 and mate with a surface of the mold 1904. The modified flocked backing film has self-aligning or self-locating properties since the three-dimensional shape corresponds to (is a male and/or female counterpart of) the mold surface 1904 with which the mold insert engages. In this embodiment, heat and/or pressure and/or vacuum or any other forming process are applied to the flocked backing film to form alternatively a male and/or female counterpart or mold insert to be received in the mold. Preferred forming techniques include thermoforming, e.g., reforming, vacuum forming, hydro-forming, etc. The mold insert film can be designed to cover the entirety of the mold or to cover only a portion of the mold.

As shown in FIG. 19, typical molds 1900 for molding parts have two or more parts (tool/die), the cooled lower part 1908 where the molten resin will be placed (or with which the molten resin will be contacted) to form the part and a cooled upper portion 1912 which has the desired shape of the part. Both parts are constantly cooled by any suitable technique, such as heat transfer or exchange techniques, to assist in the cooling process of the resin. A particularly preferred technique is to circulate a cooling fluid, such as water, through the upper and/or lower parts 1908, 1912 of the mold. Thus, when the flocked mold insert is inserted into the mold, the mold insert will fit exactly into the shape of the upper part 1912 of the mold. As will be appreciated, other suitable types of molds may be used to form the molded article.

FIGS. 20 and 21 depict a discontinuously distributed flocked design that is realizable using any of the above described techniques. The flocked design 2000 is located on only a portion of the exterior surface 2004 of the molded article 2008. The portion of the exterior surface 2004 can be free of a decorative media or contain decorative media other than flock.

In yet another embodiment, any number of molding techniques are employed. As will be appreciated, "molding" normally refers to creating a plastic or rubber article in a desired shape by application of heat and/or pressure, either in a negative cavity or in contact with a contoured metal or phenolic surface. Exemplary molding techniques that can be used with the present invention include but are not limited to high pressure injection molding, reaction injection molding, gas-assisted injection molding, fusible core injection molding, low pressure injection molding (including laminate molding and liquid-gas assist molding), advanced blow molding, blow molding, compression molding, thermoplastic sheet composite processing, reactive liquid composite molding, microcellular plastics, lamellar injection molding, and multimaterial, multiprocess technology, rotational molding, co-injection, in-mold decoration, encapsulation, stack molding, micro-injection molding, fusible core, vibration-assisted, injection molding extrusion, surface replication, direct compounding, vacuum forming, transfer molding, or any combination thereof. The finished plastic part need not be a flat plane, but by virtue of the flexibility of the flock transfer may be rounded, or portions of the part may be raised.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An article, comprising:
a carrier sheet having opposing first and second sides;
a release adhesive applied to the first side of the carrier sheet;
a plurality of flock fibers, wherein the flock fibers are conductively coated, concentric multi-component fibers, wherein the multi-component flock fiber outer surface; comprises a polyester or a co-polymer or blend thereof and wherein the flock fibers have opposing first and second ends, and wherein the first ends are adhered to the release adhesive;
a permanent adhesive having a first and second opposing sides, wherein the second ends of the flock fibers are adhered to the first side of the permanent adhesive and wherein at least most of the flock fibers are substantially parallel to one another along their entire lengths.

2. The article of claim 1, wherein the concentric multi-component fibers are bicomponent fibers each having an inner polymer composition and an outer polymer composition, the inner composition being located interiorly of the outer composition, and wherein the outer composition and inner composition have at least one differing characteristic, and wherein the at least one differing characteristic is molecular weight distribution (number average and/or weight average molecular weight), melting and/or softening point, dye absorption capacity, safe ironing temperature, glass transition temperature, tenacity, percent elongation, compression recovery, crystallinity, deflection temperature, elasticity, resilience, mechanical properties, plasticizers, blend compatibility polymers, fillers, dye stuffs, colorants, loft retention, and/or work recovery.

3. The article of claim 2, wherein the primary polymer in the inner composition is selected from the group consisting of rayon, nylon, poly(phenylene sulfide), a liquid crystal polymer, a high temperature polyamide, poly(ethylene tereplithalate), poly(ethylene tereplithalate co-1,4-cyclohexylene dimethylene terephthalate), and blends and copolymers thereof and wherein the primary polymer component of the outer composition is selected from the group consisting of poly(cyclohexylene dimethylene terephthalate), poly(ethylene terephthalate co-1,4-cyclohexylene dimethylene terephthalate), and blends and copolymers thereof.

4. The article of claim 3, wherein the outer polymer composition is poly(cyclohexylene-dimethylene terephthalate) and wherein the at least one differing characteristic is the dye absorption capacity, with the dye absorption capacity of the outer polymer composition being greater than the inner polymer composition.

5. The article of claim 1, wherein at least most of the first ends of the flock fibers are substantially perpendicular to the first side of the carrier sheet and at least most of the second ends of the flock fibers are substantially perpendicular to the first side of the permanent adhesive.

6. The article of claim 1, further comprising a thermoplastic adhesive and the wherein the permanent adhesive is a thermosetting adhesive in the thermoset stage and wherein the thermoplastic adhesive is applied to the second side of the permanent adhesive.

7. The article of claim 1, further comprising a non-planar backing film, wherein the non-planar backing film is adhered to the second side of the permanent adhesive and wherein the article is a molded article formed into a three-dimensional shape, wherein the permanent adhesive is an at least mostly fully cross-linked thermoset adhesive, and wherein the backing film is a cast or extruded continuous thermoplastic polymer.

8. The article of claim 1, wherein an inner component of the fibers primarily comprises a first polyester thermally stable at 350 degrees Fahrenheit and wherein the outer surface of the fibers primarily comprises a second polyester that is less thermally stable than the first polyester but has a greater dye absorption capacity than the second polyester.

9. The article of claim 1, further comprising a barrier layer and second permanent adhesive, wherein the barrier layer is positioned between the second side of the permanent adhesive and the second permanent adhesive, wherein the barrier provides at least one of coloration, opacity, decorative media other than the flock fibers, tensile strength, compressive strength, and inhibiting and/or blocking migration of adhesive or resin into the flock fibers to the article.

10. The article of claim 8, wherein the first polyester is more crystalline than the second polyester and wherein the first polyester has a melting and/or softening point greater than about 350 degrees Fahrenheit.

11. An article, comprising:
a carrier sheet having opposing first and second sides;
a release adhesive applied to the first side of the carrier sheet;
a plurality of flock fibers, wherein the flock fibers are conductively coated concentric multi-component fibers, wherein the flock fibers have opposing first and second ends, and wherein the first ends or the flock fibers are substantially perpendicular to the first side of the carrier sheet and adhered to the release adhesive; and
a permanent adhesive layer having opposing first and second sides, wherein the second flock fiber ends are substantially perpendicular to the permanent adhesive layer and adhered to the first side of the permanent adhesive layer.

12. The article of claim 11, wherein the multi-component fibers are bicomponent fibers each having an inner polymer composition and an outer polymer composition, the inner composition being located interiorly of the outer composition, wherein the inner and outer polymer compositions are composed primarily of polyesters, wherein the outer and inner compositions have at least one differing characteristic, wherein the outer and inner compositions have at least one differing characteristic, and wherein the at least one differing characteristic is molecular weight distribution (number average and/or weight average molecular weight), melting and/or softening point, dye absorption capacity, safe ironing temperature, glass transition temperature, tenacity, percent elongation, compression recovery, crystallinity, deflection temperature, elasticity, resilience, mechanical properties, plasticizers, blend compatibility polymers, fillers, dye stuffs, colorants, loft retention, and/or work recovery.

13. The article of claim 12, wherein the primary polymer in the inner composition is selected from the group consisting of rayon, nylon, poly(phenylene sulfide), a liquid crystal polymer, a high temperature polyamide, poly(ethylene terephthalate co-1,4-cyclohexylene dimethylene terephthalate), and blends and copolymers thereof and wherein the primary polymer component of the outer composition is selected from the group consisting of poly(cyclohexylene-dimethylene terephthalate), poly(ethylene terephthalate co-1,4-cyclohexylene dimethylene terephthalate), and blends and copolymers thereof.

14. The article of claim 13, wherein the outer polymer composition is poly(cyclohexylene-dimethylene terephthalate) and wherein the at least one differing characteristic is the dye absorption capacity, with the dye absorption capacity of the outer polymer composition being greater than the inner polymer composition.

15. The article of claim 14, wherein an inner component of the fibers primarily comprises a first polyester having a melting and/or softening point higher than about 350 degrees Fahrenheit and wherein an outer component of the fibers primarily comprises a second polyester that has a melting and/or softening point less than that of the first polyester but has a greater dye absorption capacity than the second polyester.

16. The article of claim 12, wherein at least most of the flock fibers are maintained substantially parallel to one another along their entire length.

17. An article, comprising:
a carrier sheet having opposing first and second sides;
a release adhesive applied to the first side of the carrier sheet;
a plurality of flock fibers, wherein the flock fibers are conductively coated, concentric multi-component fibers, wherein the flock fibers have first ends and opposing second ends, and wherein the first ends are adhered to the release adhesive and wherein at least one component is selected from the group consisting of poly(cyclohexylene-dimethylene terephthalate), poly(ethylene tereplithalate co-1,4-cyclohexylene dimethylene tereplithalate), and blends and copolymers thereof;
a permanent adhesive having a first and second opposing sides, wherein the second flock fiber ends are adhered to the first side of the permanent adhesive; wherein at least most of the flock fibers are substantially parallel to one another along their entire length; and wherein the flock fiber first ends are substantially perpendicular to the first side of the carrier sheet and the flock fiber second ends are substantially perpendicular to the first side of the permanent adhesive.

18. The article of claim 17, wherein the multi-component fibers are bicomponent fibers each having an inner polymer composition and an outer polymer composition, the inner composition being located interiorly of the outer composition, and wherein the outer and inner compositions have at least one differing characteristic, and wherein the at least one differing characteristic is molecular weight distribution (number average and/or weight average molecular weight), melting and/or softening point, dye absorption capacity, safe ironing temperature, glass transition temperature, tenacity, percent elongation, compression recovery, crystallinity, deflection temperature, elasticity, resilience, mechanical properties, plasticizers, blend compatibility polymers, fillers, dye stuffs, colorants, loft retention, and/or work recovery.

19. The article of claim 18, wherein the primary polymer in the inner composition is selected from the group consisting of rayon, nylon, poly(phenylene sulfide), a liquid crystal polymer, a high temperature polyamide, poly(ethylene terephthalate co-1,4-cyclohexylene dimethylene terephthalate), and blends and copolymers thereof and wherein the polymer component of the outer composition is selected from the group consisting of poly(cyclohexylene-dimethylene terephthalate), poly(ethylene terephthalate co-1,4-cyclohexylene dimethylene terephthalate), and blends and copolymers thereof.

20. The article of claim 19, wherein the outer polymer composition is poly(cyclohexylene-dimethylene tereplithalate) and wherein the at least one differing characteristic is the dye absorption capacity, with the dye absorption capacity of the outer polymer composition being greater than the inner polymer composition.

* * * * *